(12) United States Patent
Xu et al.

(10) Patent No.: US 10,700,966 B2
(45) Date of Patent: Jun. 30, 2020

(54) SIGNALING PACKET PROCESSING METHOD AND ENTITY

(71) Applicant: HUAWEI TECHNOLOGIES CO., LTD., Shenzhen, Guangdong (CN)

(72) Inventors: Yixu Xu, Shanghai (CN); Han Zhou, Shanghai (CN); Zhongping Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 80 days.

(21) Appl. No.: 15/990,074

(22) Filed: May 25, 2018

(65) Prior Publication Data
US 2018/0278518 A1    Sep. 27, 2018

Related U.S. Application Data

(63) Continuation of application No. PCT/CN2015/095884, filed on Nov. 28, 2015.

(51) Int. Cl.
| | | |
|---|---|---|
| *H04L 12/781* | (2013.01) | |
| *H04L 12/66* | (2006.01) | |
| *H04W 80/00* | (2009.01) | |
| *H04W 92/24* | (2009.01) | |
| *H04L 12/725* | (2013.01) | |
| *H04W 88/16* | (2009.01) | |

(52) U.S. Cl.
CPC .............. *H04L 45/52* (2013.01); *H04L 12/66* (2013.01); *H04W 80/00* (2013.01); *H04L 45/304* (2013.01); *H04W 88/16* (2013.01); *H04W 92/24* (2013.01)

(58) Field of Classification Search
CPC ....... H04L 12/66; H04L 45/304; H04L 45/52; H04W 80/00; H04W 88/16; H04W 92/24
See application file for complete search history.

(56) References Cited

U.S. PATENT DOCUMENTS

| | | | |
|---|---|---|---|
| 9,936,416 B2* | 4/2018 | Li | H04W 28/24 |
| 2014/0019581 A1* | 1/2014 | Baillargeon | H04W 28/12 |
| | | | 709/217 |

(Continued)

FOREIGN PATENT DOCUMENTS

| | | |
|---|---|---|
| CN | 101772114 A | 7/2010 |
| CN | 103636284 A | 3/2014 |

(Continued)

OTHER PUBLICATIONS

XP050804518 S2-141021 China Mobile,"SDN based architecture for EPC",SA WG2 Meeting #102,Mar. 24-28, 2014—Malta,total 6 pages.

(Continued)

*Primary Examiner* — Mewale A Ambaye
(74) *Attorney, Agent, or Firm* — Womble Bond Dickinson (US) LLP

(57) ABSTRACT

Embodiments of the present invention disclose a signaling packet processing method and an entity. The method may include: obtaining, by a gateway user plane entity, processing information of a target signaling packet; and receiving, by the gateway user plane entity, the target signaling packet, and processing the target signaling packet based on the processing information. Network costs can be reduced in the embodiments of the present invention.

17 Claims, 11 Drawing Sheets

---

A gateway user plane entity obtains processing information of a target signaling packet — 301

The gateway user plane entity receives the target signaling packet, and processes the target signaling packet according to the processing information — 302

(56) References Cited

U.S. PATENT DOCUMENTS

| | | | | |
|---|---|---|---|---|
| 2014/0153572 A1* | 6/2014 | Hampel | ............... | H04L 12/6418 |
| | | | | 370/392 |
| 2015/0110121 A1* | 4/2015 | Tan | ..................... | H04L 12/14 |
| | | | | 370/401 |
| 2016/0294682 A1 | 10/2016 | Bi et al. | | |
| 2017/0126618 A1* | 5/2017 | Bhaskaran | .......... | H04L 61/2007 |
| 2017/0324652 A1* | 11/2017 | Lee | ..................... | H04L 67/322 |
| 2017/0346764 A1 | 11/2017 | Tan et al. | | |
| 2019/0238345 A1* | 8/2019 | Gage | ..................... | H04W 24/10 |

FOREIGN PATENT DOCUMENTS

| | | |
|---|---|---|
| CN | 104639451 A | 5/2015 |
| CN | 104813618 A | 7/2015 |
| EP | 2861038 A1 | 4/2015 |
| EP | 3086513 A1 | 10/2016 |
| WO | 2014000266 A1 | 1/2014 |
| WO | 2015065701 A1 | 5/2015 |
| WO | 2015096005 A1 | 7/2015 |

OTHER PUBLICATIONS

XP051014162 S2-154089 Huawei, HiSilicon,"Solution to Key Issue 1—Single gateway Controller",SA WG2 Meeting #112,Nov. 16-20, 2015, Anaheim, USA,total 7 pages.

S2-153950 Nokia Networks,"Control plane and User plane functional split for S-GW, P-GW and TDF",SA WG2 Meeting #112,Nov. 16-20, 2015, Anaheim, USA,total 3 pages.

\* cited by examiner

SIGNALING PACKET PROCESSING METHOD AND ENTITY

CROSS-REFERENCE TO RELATED APPLICATIONS

This application is a continuation of International Application No. PCT/CN2015/095884, filed on Nov. 28, 2015, the disclosure of which is hereby incorporated by reference in its entirety.

TECHNICAL FIELD

The present disclosure relates to the communications field, and in particular, to a signaling packet processing method and an entity.

BACKGROUND

Currently, gateway types in a network are diversified, and a gateway of each type has a signaling packet processing capability that is distinctive and fixed. The signaling packet processing capability of the gateway mainly includes forwarding a signaling packet and responding to a signaling packet. The signaling packet processing capability of the current gateway is distinctive and fixed, that is, a processing procedure used when the current gateway processes a signaling packet is distinctive and fixed. Therefore, when the network needs to support a new protocol, a gateway currently deployed in the network may not be able to process a new-protocol-based signaling packet, and the network needs to deploy a gateway that can forward the new-protocol-based signaling packet, thereby increasing network costs.

SUMMARY

Embodiments of the present disclosure provide a signaling packet processing method and an entity, so as to reduce network costs.

According to a first aspect, an embodiment of the present disclosure provides a signaling packet processing method, including:

obtaining, by a gateway user plane entity, processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and receiving, by the gateway user plane entity, the target signaling packet, and processing the target signaling packet based on the processing information.

In this implementation, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

In a first possible implementation of the first aspect, the processing information may be further used to describe an action for forwarding the target signaling packet, where the action may include at least one of the following:

packet receiving, packet sending, encapsulation, or decapsulation.

In this implementation, the target signaling packet can be processed by performing the action described in the processing information, thereby improving signaling packet processing efficiency.

With reference to the first possible implementation of the first aspect, in a second possible implementation of the first aspect, the receiving, by the gateway user plane entity, the target signaling packet, and processing the target signaling packet based on the processing information may include:

receiving, by the gateway user plane entity based on the type information included in the processing information, the target signaling packet that matches the type information and that is sent by a network entity, and forwarding the target signaling packet based on the action included in the processing information, where the network entity includes a gateway control plane entity, an external signaling packet sending entity, or user equipment.

In this implementation, the target signaling packet sent by the network entity can be processed by performing the action described in the processing information, thereby improving signaling packet processing efficiency.

With reference to the second possible implementation of the first aspect, in a third possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a Dynamic Host Configuration Protocol (DHCP) signaling packet that matches the type information and that is sent by the user equipment, and sending the DHCP signaling packet to the gateway control plane entity based on a destination address for sending the DHCP packet and the packet sending action that are included in the processing information, so that the gateway control plane entity generates a DHCP response packet for the DHCP signaling packet.

In this implementation, the DHCP packet can be processed based on the processing information.

With reference to the third possible implementation of the first aspect, in a fourth possible implementation of the first aspect, the method further includes:

based on the packet receiving action and the encapsulation action that are included in the processing information, receiving, by the gateway user plane entity, the DHCP response packet sent by the gateway control plane entity, and encapsulating the DHCP response packet into a tunnel packet and sending the tunnel packet to the user equipment.

In this implementation, the DHCP response sent by the gateway control plane entity can be encapsulated as a tunnel packet and then sent to the user equipment.

With reference to the fourth possible implementation of the first aspect, in a fifth possible implementation of the first aspect, the method further includes:

sending, by the gateway user plane entity to the gateway control plane entity, an indication message that a signaling packet received by the gateway control plane entity is a DHCP signaling type packet; and/or receiving, by the gateway user plane entity, an operation instruction that is for performing tunnel packet encapsulation on the DHCP response packet and that is sent by the gateway control plane entity, receiving, based on the packet receiving action included in the processing information, the DHCP response packet sent by the gateway control plane entity, and encapsulating the DHCP response packet into the tunnel packet based on the operation instruction and sending the tunnel packet to the user equipment.

In this implementation, the signaling packet sent by the network entity can be implemented as a DHCP signaling type packet based on the indication message. Therefore, the signaling packet sent by the network entity does not need to be parsed, so as to improve efficiency of identifying the DHCP signaling type packet. In addition, the gateway user plane entity encapsulates the DHCP response packet into the tunnel packet based on the operation instruction sent by the gateway control plane entity, and sends the tunnel packet to the user equipment. In this way, the gateway user plane entity can flexibly forward the packet based on the operation instruction.

With reference to the second possible implementation of the first aspect, in a sixth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a proxy binding update (PBU) packet that matches the type information and that is sent by the gateway control plane entity, where the PBU packet is generated by the gateway control plane entity; and sending, by the gateway user plane entity, the PBU packet to the peer gateway based on a destination address for sending the PBU packet and the packet sending action that are included in the processing information, where a source address of the PBU packet forwarded to the peer gateway is an address of the gateway user plane entity; and the method further includes:

receiving, by the gateway user plane entity, a proxy binding acknowledgement (PBA) packet that is sent by the peer gateway and that is generated in response to the PBU packet, and sending the PBA packet to the gateway control plane entity based on a destination address for sending the PBA packet and the packet sending action that are included in the processing information, so that the gateway control plane entity responds to the PBA packet.

In this implementation, the PBU packet and the PBA packet can be processed.

With reference to the first possible implementation of the first aspect, in a seventh possible implementation of the first aspect, the method further includes:

receiving, by the gateway user plane entity, an operation instruction that is for directly sending a PBU packet and that is sent by the gateway control plane entity;

the receiving, by the gateway user plane entity, the target signaling packet, and processing the target signaling packet based on the processing information includes:

receiving, by the gateway user plane entity based on the type information included in the processing information, a proxy binding update PBU packet that matches the type information and that is sent by the gateway control plane entity, where the PBU packet is generated by the gateway control plane entity; and sending, by the gateway user plane entity, the PBU packet to the peer gateway based on a destination address for sending the PBU packet that is included in the processing information and the operation instruction, where a source address of the PBU packet forwarded to the peer gateway is an address of the gateway user plane entity; and the method further includes:

receiving, by the gateway user plane entity, a PBA packet that is sent by the peer gateway and that is generated in response to the PBU packet, and sending the PBA packet to the gateway control plane entity based on a destination address for sending the PBA packet and the packet sending action that are included in the processing information, so that the gateway control plane entity responds to the PBA packet.

In this implementation, the PBU packet can be forwarded based on the operation instruction delivered by the gateway control plane entity, so that the PBU packet can be more flexibly processed.

With reference to the second possible implementation of the first aspect, in an eighth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, an Internet Key Exchange Protocol (IKE) signaling packet that matches the type information and that is sent by the user equipment, and sending the IKE signaling packet to the gateway control plane entity based on a destination address for sending the IKE signaling packet and the packet sending action that are included in the processing information, so that the gateway control plane entity generates an IKE response packet for the IKE signaling packet.

In this implementation, the IKE signaling packet can be processed.

In addition, in the eighth possible implementation, the method may further include the following operation:

based on the packet receiving action and the packet sending action that are included in the processing information, receiving, by the gateway user plane entity, the IKE response packet sent by the gateway control plane entity, and forwarding the IKE response packet to the user equipment.

In addition, in the eighth possible implementation, the method may further include the following operation:

sending, by the gateway user plane entity to the gateway control plane entity, an indication message that a packet received by the gateway control plane entity is an IKE signaling type packet; and/or receiving, by the gateway user plane entity, an operation instruction that is for directly sending the IKE response packet and that is sent by the gateway control plane entity, receiving the IKE response packet based on the packet receiving action included in the processing information, and forwarding the IKE response packet to the user equipment based on a destination address for sending the IKE response packet that is included in the operation instruction.

With reference to the second possible implementation of the first aspect, in a ninth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, an Extensible Authentication Protocol (EAP) signaling packet that matches the type information and that is sent by the user equipment, and sending the EAP signaling packet to the gateway control plane entity based on a destination address for sending the EAP signaling packet and the packet sending action that are included in the processing information, so that the gateway control plane entity generates an EAP response packet for the EAP signaling packet.

In this implementation, the EAP signaling packet can be processed.

In addition, in the ninth possible implementation, the method may further include the following operation:

based on the packet receiving action and the packet sending action that are included in the processing information, receiving, by the gateway user plane entity, the EAP response packet sent by the gateway control plane entity, and forwarding the EAP response packet to the user equipment.

In addition, in the ninth possible implementation, the method may further include the following operation:

sending, by the gateway user plane entity to the gateway control plane entity, an indication message that a packet received by the gateway control plane entity is the EAP signaling type packet; and/or receiving, by the gateway user plane entity, an operation instruction that is for directly sending the EAP response packet and that is sent by the gateway control plane entity, receiving the EAP response packet based on the packet receiving action included in the processing information, and forwarding the EAP response packet to the user equipment based on a destination address for sending the EAP response packet that is included in the operation instruction.

With reference to the second possible implementation of the first aspect, in a tenth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a tunnel packet that matches the type information and that is sent by the user equipment, decapsulating, based on the packet decapsulation action included in the processing information, the tunnel packet to obtain a Point-to-Point Protocol (PPP) signaling packet, and forwarding the PPP signaling packet to the gateway control plane entity based on a destination address for sending the PPP signaling packet and the packet sending action that are included in the processing information, so that the gateway control plane entity generates a PPP response packet for the PPP signaling packet.

In this implementation, the PPP signaling packet can be processed.

In addition, in the tenth possible implementation, the method may further include the following operation:

based on the packet receiving action and the encapsulation action that are included in the processing information, receiving, by the gateway user plane entity, the PPP response packet sent by the gateway control plane entity, and encapsulating the PPP response packet into a tunnel packet and sending the tunnel packet to the user equipment.

In addition, in the tenth possible implementation, the method may further include the following operation:

sending, by the gateway user plane entity to the gateway control plane entity, an indication message that a packet received by the gateway control plane entity is the PPP signaling type packet; and/or receiving, by the gateway user plane entity, an operation instruction that is for performing tunnel packet encapsulation on the PPP response packet and that is sent by the gateway control plane entity, receiving the PPP response packet based on the packet receiving action included in the processing information, and encapsulating the PPP response packet into a tunnel packet and sending the tunnel packet to the user equipment based on a destination address for sending the PPP response packet that is included in the operation instruction.

With reference to the second possible implementation of the first aspect, in an eleventh possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a tunnel packet that matches the type information and that is sent by the user equipment, decapsulating, based on the packet decapsulation action included in the processing information, the tunnel packet to obtain a PPP signaling packet, and forwarding the PPP signaling packet to the gateway control plane entity based on a destination address for sending the PPP signaling packet and the packet sending action that are included in the processing information, so that the gateway control plane entity triggers a tunnel creation procedure based on the PPP signaling packet.

In this implementation, the PPP signaling packet can be processed.

In addition, in the eleventh possible implementation, the method may further include the following operation:

based on the packet receiving action and the encapsulation action that are included in the processing information, receiving, by the gateway user plane entity, the PPP signaling packet that is sent by the gateway control plane entity and whose destination address is an address of an authentication server, and encapsulating the PPP signaling packet whose destination address is the address of the authentication server into the tunnel packet and sending the tunnel packet to the authentication server, so that the authentication server generates a PPP response packet for the PPP signaling packet; and receiving, by the gateway user plane entity based on the type information included in the processing information, a tunnel packet that matches the type information, that carries the PPP response packet, and that is sent by the authentication server, and based on the encapsulation action and the decapsulation action that are included in the processing information, decapsulating the tunnel packet so as to obtain the PPP response packet, and encapsulating the PPP response packet into a tunnel packet and sending the tunnel packet to the user equipment.

In addition, in the eleventh possible implementation, the method may further include the following operation:

receiving, by the gateway user plane entity, an operation instruction that is for performing tunnel packet encapsulation on the PPP signaling packet and the PPP response packet and that is sent by the gateway control plane entity;

receiving, by the gateway user plane entity based on the packet receiving action included in the processing information, the PPP signaling packet that is sent by the gateway control plane entity and whose destination address is an address of the authentication server, encapsulating the PPP signaling packet whose destination address is the address of the authentication server into the tunnel packet based on the operation instruction, and sending the tunnel packet to the authentication server, so that the authentication server generates a PPP response packet for the PPP signaling packet; and receiving, by the gateway user plane entity based on the type information included in the processing information, a tunnel packet that matches the type information, that carries the PPP response packet, and that is sent by the authentication server, decapsulating, based on the operation instruction, the tunnel packet so as to obtain the PPP response packet, and encapsulating the PPP response packet into a tunnel packet based on a destination address for sending the PPP response packet that is included in the operation instruction, and sending the tunnel packet to the user equipment.

With reference to the second possible implementation of the first aspect, in a twelfth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a PPP signaling packet that matches the type information and that is sent by the gateway control plane entity; and based on the encapsulation action, the packet sending action, and a destination address for sending the PPP signaling packet that are included in the processing information, encapsulating, by the gateway user plane entity, the PPP signaling packet into a tunnel packet, and sending the tunnel packet to the authentication server, so that the authentication server generates a PPP response packet for the PPP signaling packet; and the method further includes:

based on the packet receiving action and the decapsulation action that are included in the processing information, receiving, by the gateway user plane entity, a tunnel packet that carries the PPP response packet and that is sent by the authentication server, decapsulating the tunnel packet that carries the PPP response packet, so as to obtain the PPP response packet, and sending the PPP response packet to the gateway control plane entity, so that the gateway control plane entity responds to the PPP response packet.

In this implementation, the PPP signaling packet can be processed.

With reference to the first possible implementation of the first aspect, in a thirteenth possible implementation of the first aspect, the method further includes:

receiving, by the gateway user plane entity, an operation instruction that is for performing tunnel packet encapsulation on a PPP signaling packet and that is sent by the gateway control plane entity; and the receiving, by the gateway user plane entity, the target signaling packet, and processing the target signaling packet based on the processing information includes:

receiving, by the gateway user plane entity based on the type information included in the processing information, a PPP signaling packet that matches the type information and that is sent by the gateway control plane entity; and encapsulating, by the gateway user plane entity, the PPP signaling packet into a tunnel packet based on a destination address for sending the PPP signaling packet that is included in the operation instruction, and sending the tunnel packet to the authentication server, so that the authentication server generates a PPP response packet for the PPP signaling packet; and the method further includes:

based on the packet receiving action and the decapsulation action that are included in the processing information, receiving, by the gateway user plane entity, a tunnel packet that carries the PPP response packet and that is sent by the authentication server, decapsulating the tunnel packet that carries the PPP response packet, so as to obtain the PPP response packet, and sending the PPP response packet to the gateway control plane entity, so that the gateway control plane entity responds to the PPP response packet.

In this implementation, the PPP signaling packet can be forwarded based on the operation instruction delivered by the gateway control plane entity, so that the PPP signaling packet can be more flexibly processed.

With reference to the second possible implementation of the first aspect, in a fourteenth possible implementation of the first aspect, the receiving, by the gateway user plane entity, the target signaling packet delivered by a gateway control plane entity, and forwarding the target signaling packet based on a processing procedure corresponding to the processing information includes:

receiving, by the gateway user plane entity based on the type information included in the processing information, a Layer 2 Tunneling Protocol (L2TP) signaling packet that matches the type information and that is sent by the gateway control plane entity, where the L2TP signaling packet is generated by the gateway control plane entity; and sending, by the gateway user plane entity, the L2TP signaling packet to the authentication server based on the packet sending action and a destination address for sending the L2TP signaling packet that are included in the processing information, where a source address of the L2TP signaling packet forwarded to the authentication server is an address of the gateway user plane entity; and the method further includes:

based on the packet receiving action and the packet sending action that are included in the processing information, receiving, by the gateway user plane entity, an L2TP response packet that is sent by the authentication server and that is for responding to the L2TP signaling packet, and sending the L2TP response packet to the gateway control plane entity, so that the gateway control plane entity responds to the L2TP response packet.

In this implementation, the L2TP signaling packet can be processed.

With reference to the first possible implementation of the first aspect, in a fifteenth possible implementation of the first aspect, the method further includes:

receiving, by the gateway user plane entity, an operation instruction that is for directly sending the L2TP signaling packet and that is sent by the gateway control plane entity; and the receiving, by the gateway user plane entity, the target signaling packet, and processing the target signaling packet based on the processing information includes:

receiving, by the gateway user plane entity based on the type information included in the processing information, an L2TP signaling packet that matches the type information and that is sent by the gateway control plane entity, where the L2TP signaling packet is generated by the gateway control plane entity; and sending, by the gateway user plane entity, the L2TP signaling packet to the authentication server based on a destination address for sending the L2TP signaling packet that is included in the operation instruction, where a source address of the L2TP signaling packet forwarded to the authentication server is an address of the gateway user plane entity; and the method further includes:

based on the packet receiving action and the packet sending action that are included in the processing information, receiving, by the gateway user plane entity, an L2TP response packet that is sent by the authentication server and that is for responding to the L2TP signaling packet, and sending the L2TP response packet to the gateway control plane entity, so that the gateway control plane entity responds to the L2TP response packet.

In this implementation, the L2TP packet can be forwarded based on the operation instruction delivered by the gateway control plane entity, so that the L2TP packet can be more flexibly processed.

With reference to the second possible implementation of the first aspect, in a sixteenth possible implementation of the first aspect, the receiving, by the gateway user plane entity based on the type information included in the processing information, the target signaling packet that matches the type information and that is sent by a network entity, and forwarding the target signaling packet based on the action included in the processing information includes:

receiving, by the gateway user plane entity based on the type information included in the processing information, a GTP-C signaling type packet that matches the type information and that is sent by a network element device, and sending the GTP-C signaling type packet to the gateway control plane entity based on a destination address for sending the GTP-C signaling type packet and the packet sending action that are included in the processing information, so that the gateway control plane entity generates a GTP-C response packet for the GTP-C signaling type packet, where a destination TEID of the GTP-C response packet is a TEID of an interface between the network element device and the gateway user plane entity; and the method further includes:

receiving, by the gateway user plane entity based on the packet receiving action included in the processing information, the GTP-C response packet sent by the gateway control plane entity, and forwarding the GTP-C response packet to the network element device.

In this implementation, the GTP-C signaling packet can be processed.

In addition, in the sixteenth possible implementation, the method may further include the following operation:

sending, by the gateway user plane entity to the gateway control plane entity, an indication message that a packet received by the gateway control plane entity is the GTP-C signaling type packet; and/or receiving, by the gateway user plane entity, an operation instruction that is for directly sending the GTP-C response packet and that is sent by the gateway control plane entity; and the forwarding, by the gateway user plane entity, the GTP-C response packet to the network element device includes:

forwarding, by the gateway user plane entity, the GTP-C response packet to the network element device based on a destination address for sending the GTP-C response packet that is included in the operation instruction.

With reference to the first aspect, in a seventeenth possible implementation of the first aspect, the forwarding object includes any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity; and the forwarding action includes any one or more of the following:

a first forwarding action, a second forwarding action, a third forwarding action, a fourth forwarding action, a fifth forwarding action, a sixth forwarding action, or a seventh forwarding action; where the first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

With reference to the seventeenth possible implementation of the first aspect, in an eighteenth possible implementation of the first aspect, the receiving, by the gateway user plane entity, the target signaling packet, and processing the target signaling packet based on a processing procedure corresponding to the processing information includes:

receiving, by the gateway user plane entity, the target signaling packet, and performing the forwarding action that the forwarding object should complete, so as to forward the target signaling packet.

In this implementation, the target signaling packet can be forwarded based on the forwarding action that the forwarding object should complete.

In addition, in the eighteenth possible implementation, the processing information may include the bearer object and the forwarding plane control object, the bearer object should complete the first forwarding action, and the forwarding plane control object should complete the fifth forwarding action; and the operation of performing, by the gateway user plane entity, the forwarding action that the forwarding object should complete, so as to forward the target signaling packet may include:

performing, by the gateway user plane entity, the first forwarding action that the bearer object should complete, so as to identify a first target signaling packet that matches the attribute of the bearer object and that is sent by user equipment, where the first target signaling packet includes a DHCP signaling packet or a PPP signaling packet; and performing, by the gateway user plane entity, the fifth forwarding action that the forwarding plane control object should complete, so as to forward the first target signaling packet to the gateway control plane entity.

In addition, the bearer object in the processing information may further complete the second forwarding action, and the method may further include the following operation:

performing, by the gateway user plane entity, the second forwarding action that the bearer object should complete, so as to encapsulate, into the first target signaling packet, packet type information that is of the first target signaling packet and that is obtained by performing the first forwarding action; and the performing, by the gateway user plane entity, the fifth forwarding action that the forwarding plane control object should complete, so as to forward the first target signaling packet to the gateway control plane entity may include:

performing, by the gateway user plane entity, the fifth forwarding action that the forwarding plane control object should complete, so as to forward the encapsulated first target signaling packet to the forwarding plane control object.

In addition, in the eighteenth possible implementation, the processing information may include the bearer object and the forwarding plane control object, the bearer object should complete the third forwarding action and the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate a second target signaling packet sent by the gateway control plane entity, where the second target signaling packet includes a DHCP signaling packet or a PPP signaling packet; and performing, by the gateway user plane entity, the third forwarding action that the bearer object should complete, so as to encapsulate the decapsulated second target signaling packet based on the attribute of the bearer object; and performing the fifth forwarding action that the bearer object should complete, so as to forward the encapsulated second target signaling packet to user equipment.

In addition, in the eighteenth possible implementation, the processing information may include the link object and the forwarding plane control object, the link object should complete the first forwarding action, and the forwarding plane control object should complete the fifth forwarding action; and the operation of performing, by the gateway user plane entity, the forwarding action that the forwarding object should complete, so as to forward the target signaling packet may include:

performing, by the gateway user plane entity, the first forwarding action that the link object should complete, so as to identify a third target signaling packet that matches the attribute of the link object and that is sent by a peer gateway, where the third target signaling packet includes a PMIP signaling packet; and performing, by the gateway user plane entity, the fifth forwarding action that the forwarding plane control object should complete, so as to forward the third target signaling packet to the gateway control plane entity.

In addition, in the eighteenth possible implementation, the processing information may include the link object and the forwarding plane control object, the link object should complete the third forwarding action and the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate a fourth target signaling packet sent by the gateway control plane entity, where the fourth target signaling packet includes a PMIP signaling packet; and performing, by the gateway user plane entity, the third forwarding action that the link object should complete, so as to encapsulate the decapsulated fourth target signaling packet based on the attribute of the link object; and performing the fifth forwarding action that the link object should complete, so as to forward the encapsulated fourth target signaling packet to a peer gateway.

In addition, in the eighteenth possible implementation, the processing information may include the link object and the forwarding plane control object, the link object should complete the first forwarding action, and the forwarding plane control object should complete the fifth forwarding action; and the operation of performing, by the gateway user plane entity, the forwarding action that the forwarding object should complete, so as to forward the target signaling packet may include:

performing, by the gateway user plane entity, the first forwarding action that the link object should complete, so as to identify a fifth target signaling packet that matches the attribute of the link object and that is sent by user equipment, where the fifth target signaling packet includes an IKE packet or an EAP signaling packet; and performing, by the gateway user plane entity, the fifth forwarding action that the forwarding plane control object should complete, so as to forward the fifth target signaling packet to the gateway control plane entity.

In addition, in the eighteenth possible implementation, the processing information may include the link object and the forwarding plane control object, the link object should complete the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate a sixth target signaling packet sent by the gateway control plane entity, where the sixth target signaling packet includes an IKE signaling packet or an EAP signaling packet; and performing, by the gateway user plane entity, the fifth forwarding action that the link object should complete, so as to forward the sixth target signaling packet to user equipment.

In addition, in the eighteenth possible implementation, the processing information may include a first bearer object and the forwarding plane control object, the first bearer object should complete the sixth forwarding action and the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate a seventh target signaling packet sent by the gateway control plane entity, where the seventh target signaling packet includes a PPP signaling packet; and performing, by the gateway user plane entity, the sixth forwarding action that the first bearer object should complete, so as to encrypt the seventh target signaling packet; and performing the fifth forwarding action that the first bearer object should complete, so as to forward the encrypted seventh target signaling packet to an authentication server.

In addition, in the eighteenth possible implementation, the processing information may further include the link object and a second bearer object, the link object should complete the seventh forwarding action, and the second bearer object should complete the fifth forwarding action and the third forwarding action; and the method may further include the following operations:

performing, by the gateway user plane entity, the seventh forwarding action that the link object should complete, so as to decrypt an eighth target signaling packet sent by an authentication server, where the eighth target signaling packet includes a PPP signaling packet; and performing, by the gateway user plane entity, the third forwarding action that the second bearer object should complete, so as to encapsulate the decrypted eighth target signaling packet based on an attribute of the second bearer object; and performing the fifth forwarding action that the second bearer object should complete, so as to forward the encapsulated eighth target signaling packet to user equipment.

In addition, in the eighteenth possible implementation, the processing information may include the bearer object and the forwarding plane control object, the bearer object should complete the sixth forwarding action and the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate a ninth target signaling packet sent by the gateway control plane entity, where the ninth target signaling packet includes a PPP signaling packet; and performing, by the gateway user plane entity, the sixth forwarding action that the bearer object should complete, so as to encrypt the ninth target signaling packet; and performing the fifth forwarding action that the bearer object should complete, so as to forward the encrypted ninth target signaling packet to an authentication server.

In addition, in the eighteenth possible implementation, the processing information may further include the link object, the link object should complete the seventh forwarding action and the first forwarding action, and the forwarding plane control object further should complete the fifth forwarding action; and the method may further include the following operations:

performing, by the gateway user plane entity, the seventh forwarding action that the link object should complete, so as to decrypt a signaling packet sent by an authentication server; and performing the first forwarding action that the link object should complete, so as to identify the decrypted signaling packet as a tenth target signaling packet, where the tenth target signaling packet includes a PPP signaling packet; and performing, by the gateway user plane entity, the fifth forwarding action that the forwarding plane control object should complete, to send the identified tenth target signaling packet to the gateway control plane entity.

In addition, in the eighteenth possible implementation, the processing information may include the bearer object and the forwarding plane control object, the bearer object should complete the fifth forwarding action, and the forwarding plane control object should complete the fourth forwarding action; and the operation of performing, by the gateway user plane entity, the forwarding action that the forwarding object should complete, so as to forward the target signaling packet may include:

performing, by the gateway user plane entity, the fourth forwarding action that the forwarding plane control object should complete, so as to decapsulate an eleventh target signaling packet sent by the gateway control plane entity, where the eleventh target signaling packet includes an L2TP signaling packet; and performing, by the gateway user plane entity, the fifth forwarding action that the bearer object should complete, so as to forward the eleventh target signaling packet to an authentication server.

In addition, in the eighteenth possible implementation, the processing information may further include the link object, the link object should complete the seventh forwarding action and the first forwarding action, and the forwarding plane control object further should complete the fifth forwarding action; and the method may further include the following operations:

performing, by the gateway user plane entity, the seventh forwarding action that the link object should complete, so as to decrypt a signaling packet sent by the authentication server; and performing the first forwarding action that the link object should complete, so as to identify the decrypted signaling packet as a twelfth target signaling packet, where the twelfth target signaling packet includes an L2TP signaling packet; and performing, by the gateway user plane entity, the fifth forwarding action that the forwarding plane control object should complete, to send the identified twelfth target signaling packet to the gateway control plane entity.

In addition, in the eighteenth possible implementation, the processing information may include the link object and the forwarding plane control object, the link object should complete the first forwarding action, and the forwarding plane control object should complete the fifth forwarding action; and the operation of performing, by the gateway user plane entity, the forwarding action that the forwarding object should complete, so as to forward the target signaling packet may include:

performing, by the gateway user plane entity, the first forwarding action that the link object should complete, so as to identify a thirteenth target signaling packet that matches the attribute of the link object and that is sent by a gateway device, where the thirteenth target signaling packet includes a GTP signaling packet; and performing, by the gateway user plane entity, the fifth forwarding action that the forwarding plane control object should complete, so as to forward the thirteenth target signaling packet to the gateway control plane entity.

In addition, in the eighteenth possible implementation, the processing information may include the bearer object, the bearer object should complete the third forwarding action and the fifth forwarding action, and the forwarding plane control object should complete the fourth forwarding action; and the method may further include the following operations:

performing, by the gateway user plane entity, the fourth forwarding action that the forwarding plane control object should complete, so as to decapsulate a fourteenth target signaling packet sent by the gateway control plane entity, where the fourteenth target signaling packet includes a GTP signaling packet; and performing, by the gateway user plane entity, the third forwarding action that the bearer object should complete, so as to encapsulate the decapsulated fourteenth target signaling packet based on the attribute of the bearer object; and performing the fifth forwarding action that the bearer object should complete, so as to forward the encapsulated fourteenth target signaling packet to the gateway device.

In addition, in the first aspect, the obtaining, by a gateway user plane entity, processing information of a target signaling packet may include:

receiving, by the gateway user plane entity, the processing information sent by the gateway control plane entity; or configuring, by the gateway user plane entity, the processing information.

In this way, the processing information can be obtained more flexibly.

According to a second aspect, an embodiment of the present disclosure provides a signaling packet processing method, including:

generating, by a gateway control plane entity, processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and sending, by the gateway control plane entity, the processing message to the gateway user plane entity, so that the gateway user plane entity receives the target signaling packet, and processes the target signaling packet based on the processing information.

In this implementation, the gateway user plane entity can flexibly process the signaling packet based on the obtained processing information. Therefore, when a network should support a new protocol, the gateway user plane obtains processing information of a new-protocol-based signaling packet, so as to process the new-protocol-based signaling packet. Therefore, no gateway should be additionally deployed, so as to reduce network costs.

In a first possible implementation of the second aspect, the method further includes:

receiving, by the gateway control plane entity, the target signaling packet sent by the gateway user plane entity, and responding to the target signaling packet.

In this implementation, the gateway user plane entity can forward the target signaling packet, and the gateway control plane entity can respond to the target signaling packet, so as to implement separation of forwarding and responding, and reduce network costs.

With reference to the first possible implementation of the second aspect, in a second possible implementation of the second aspect, the method further includes:

sending, by the gateway control plane entity, the gateway user plane entity a response packet generated in response to the target signaling packet, so that the gateway user plane entity forwards the response packet based on the processing information; or sending, by the gateway control plane entity, the gateway user plane entity a response packet generated in response to the target signaling packet, and sending an operation instruction for the response packet to the gateway user plane entity, so that the gateway user plane entity forwards the response packet based on the operation instruction.

With reference to the second aspect, in a third possible implementation of the second aspect, the method further includes:

sending, by the gateway control plane entity, the target signaling packet to the gateway user plane entity.

In this implementation, the gateway user plane entity can process the target signaling packet sent by the gateway control plane entity.

With reference to the second aspect, in a fourth possible implementation of the second aspect, the processing information is further used to describe an action for forwarding the target signaling packet, where the action includes at least one of the following:

packet receiving, packet sending, encapsulation, or decapsulation.

With reference to the second aspect, in a fifth possible implementation of the second aspect, the forwarding object includes any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity; and the forwarding action includes any one or more of the following:

a first forwarding action, a second forwarding action, a third forwarding action, a fourth forwarding action, a fifth forwarding action, a sixth forwarding action, or a seventh forwarding action;

the first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

According to a third aspect, an embodiment of the present disclosure provides a gateway user plane entity, where the entity is configured to implement functions of the method provided in the first aspect, is implemented by hardware/software, and the hardware/software includes units corresponding to the functions.

According to a fourth aspect, an embodiment of the present disclosure provides a gateway control plane entity, where the entity is configured to implement functions of the method provided in the second aspect, is implemented by hardware/software, and the hardware/software includes units corresponding to the functions.

According to a fifth aspect, an embodiment of the present disclosure provides a gateway user plane entity, including: a processor, a network interface, a memory, and a communications bus, where the communications bus is configured to implement connection and communication among the processor, the network interface, and the memory, and the processor executes a program stored in the memory to implement the method provided in the first aspect.

According to a sixth aspect, an embodiment of the present disclosure provides a gateway control plane entity, including: a processor, a network interface, a memory, and a communications bus, where the communications bus is configured to implement connection and communication among the processor, the network interface, and the memory, and the processor executes a program stored in the memory to implement the method provided in the second aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
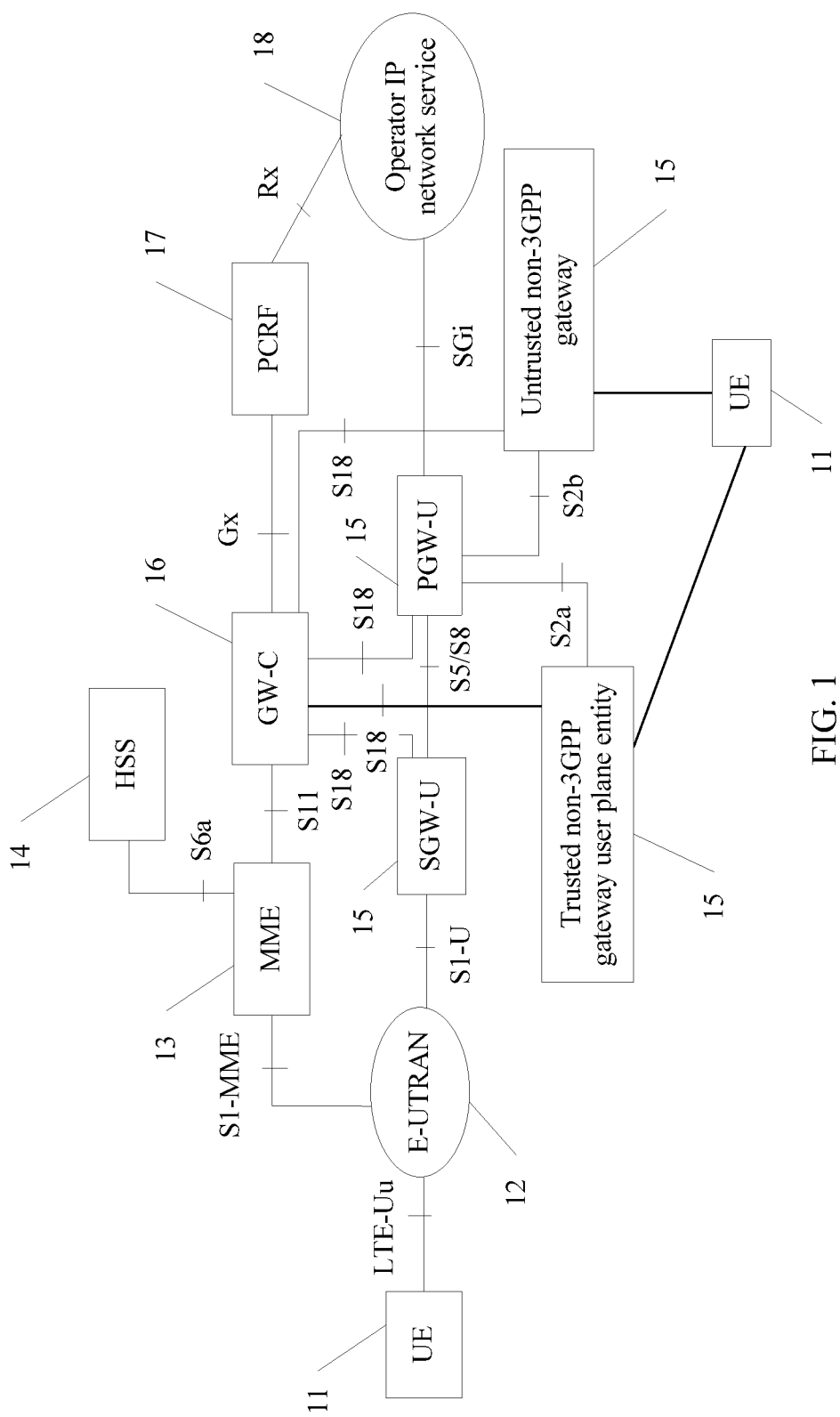
FIG. 1 is a schematic diagram of a system architecture according to an embodiment of the present disclosure.

Referring to FIG. 1, FIG. 1 is a schematic diagram of a system architecture according to an embodiment of the present disclosure. As shown in FIG. 1, the system architecture includes one or more UEs 11, an evolved universal terrestrial radio access network (E-UTRAN) 12, a mobility management entity (MME) 13, a home subscriber server (HSS) 14, a gateway user plane entity (GW-U) 15, a gateway control plane entity (GW-C) 16, a policy and charging rules function (PCRF) entity 17, and an operator IP network service 18. The operator IP network service 18 may be an IP multimedia subsystem (IMS), a packet service subsystem PSS, or the like. As shown in FIG. 1, the UE 11 may access the E-UTRAN 12 by using an LTE-Uu interface, the E-UTRAN 12 may be connected to the MME 13 by using an S1-MME interface, the E-UTRAN 12 may be connected to the GW-U 15 by using an S1-U interface, the MME 13 may be connected to the HSS 14 by using an Sha interface, the MME 13 may be connected to the GW-C 16 by using an S11 interface, the GW-C 16 may be connected to the GW-U 15 by using an S18 interface, the GW-C 16 may be connected to the PCRF 17 by using a Gx interface, the PCRF 17 may be connected to the operator IP network service 18 by using an Rx interface, and the GW-U 15 may also be connected to the UE 1. In addition, the GW-U 15 may be an entity that implements a gateway user plane function, for example, forwards a signaling packet. The GW-U 15 may be a distributed gateway entity. For example, as shown in FIG. 1, the GW-U 15 may include one or more of a serving gateway user plane entity (SGW-U), a packet data network gateway user plane entity (PGW-U), an untrusted non-3GPP gateway Untrusted Non-3GPP GW-U, or a trusted non-3GPP gateway user plane entity Trusted Non-3GPP GW-U. A connection relationship between the entities included by the GW-U 15 may be shown in FIG. 1. In addition, the GW-C 16 may implement a gateway control plane function, for example, respond to a signaling packet. In addition, the GW-C 16 may further integrate signaling packet processing capabilities of various types of gateways. For example, the GW-C 16 integrates signaling packet processing capabilities of various types of gateways by means of local configuration or operation and maintenance (OM) configuration. In the foregoing network architecture, a signaling packet may be forwarded by the GW-U 15, and a response to the signaling packet may be made by the GW-C 16, so that when a network should support a new-protocol-based signaling packet, the GW-U 15 obtains processing information of the new-protocol-based signaling packet, so as to forward the new-protocol-based signaling packet. Therefore, no gateway should be additionally deployed, so as to reduce network costs.

It should be noted that the network architecture shown in FIG. 1 is merely an example of a network architecture to which this embodiment of the present disclosure is applicable. This embodiment of the present disclosure may be applied to any network architecture in which a signaling packet should be processed, for example, an EPC network.

Figure 2:
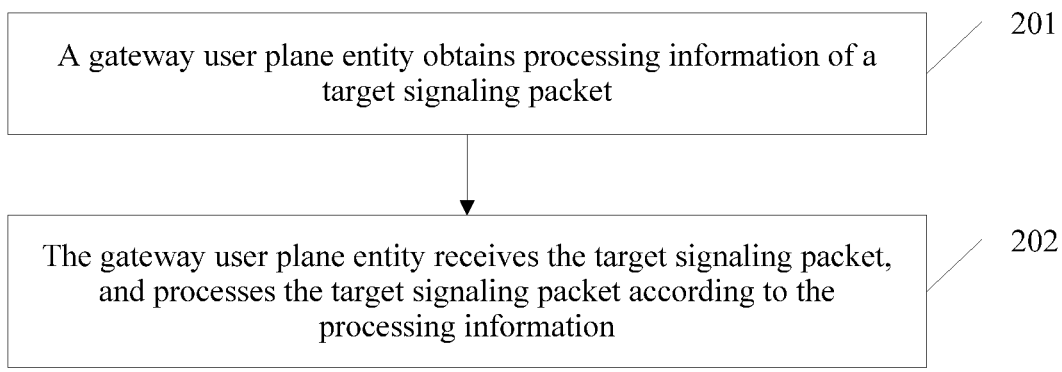
FIG. 2 is a schematic flowchart of a signaling packet processing method according to an embodiment of the present disclosure.

Referring to FIG. 2, FIG. 2 is a schematic flowchart of a signaling packet processing method according to an embodiment of the present disclosure. As shown in FIG. 2, the method includes the following operations.

201. A gateway user plane entity obtains processing information of a target signaling packet.

The processing information includes at least one of a forwarding object, type information of the target signaling packet that the gateway user plane entity should receive, or a destination address to which the gateway user plane entity should send the target signaling packet. That is, the processing information includes one or more of the forwarding object, the type information of the target signaling packet that the gateway user plane entity should receive, and the destination address to which the gateway user plane entity should send the target signaling packet.

In this embodiment, the processing information may indicate a processing procedure of the target signaling packet or the processing information may indicate an action and a parameter of processing performed by the gateway user plane entity on the target signaling packet. In addition, in block 201, it may be that the processing information generated and forwarded by a gateway control plane entity is received, or may be that the gateway user plane entity configures the processing information.

In addition, in this embodiment, the target signaling packet may be any signaling packet that can be transmitted in a network. For example, the target signaling packet may be a DHCP signaling packet, a proxy mobile IP (PMIP) signaling packet, an IKE signaling packet, an EAP signaling packet, a PPP signaling packet, an L2TP signaling packet, or a GTP signaling packet.

202. The gateway user plane entity receives the target signaling packet, and processes the target signaling packet based on the processing information.

In this embodiment, processing the target signaling packet based on the processing information may be forwarding the target signaling packet based on the processing procedure corresponding to the processing information, or processing the target signaling packet based on the processing action and the processing parameter that are included in the processing information.

In addition, as shown in FIG. 1, in this embodiment, the gateway user plane entity and the gateway control plane entity may be connected by using the S18 interface. The S18 interface may use the GPRS tunneling protocol (GTP) as a transmission protocol. Certainly, in this embodiment, the gateway user plane entity and the gateway control plane entity may be connected by using an interface of another protocol, for example, may be connected by using an interface of a transmission protocol such as the Transmission Control Protocol (TCP) or the User Datagram Protocol (UDP).

In this embodiment, the gateway user plane entity obtains the processing information of the target signaling packet; and the gateway user plane entity receives the target signaling packet, and processes the target signaling packet based on the processing information. In this way, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

Figure 3:
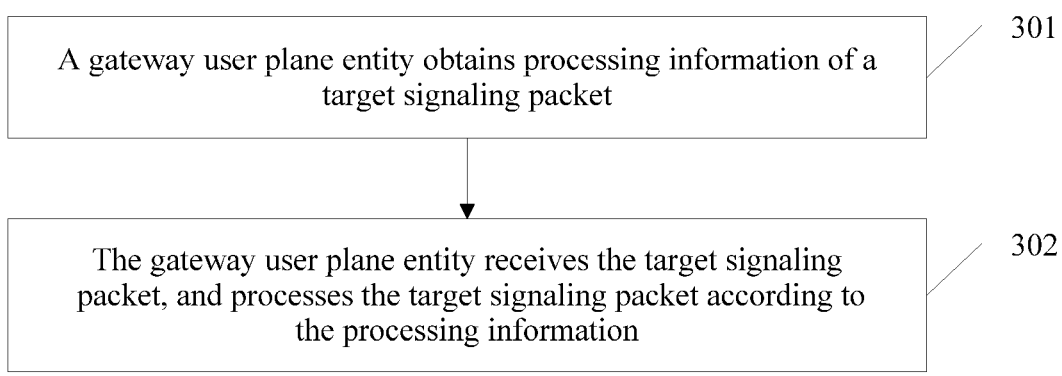
FIG. 3 is a schematic flowchart of another signaling packet processing method according to an embodiment of the present disclosure.

Referring to FIG. 3, FIG. 3 is a schematic flowchart of another signaling packet processing method according to an embodiment of the present disclosure. As shown in FIG. 3, the method includes the following operations.

301. A gateway user plane entity obtains processing information of a target signaling packet, where the processing information includes at least one of the following:

type information of the target signaling packet that the gateway user plane entity should receive and a destination address to which the gateway user plane entity should send the target signaling packet.

The type information indicates that a signaling packet of which type information should be received. In addition, the destination address may indicate a destination address to which the gateway user plane entity should send the target signaling packet.

In this embodiment, block 301 may include:

The gateway user plane entity receives the processing information sent by the gateway control plane entity.

In this implementation, the processing information may be generated by the gateway control plane entity. For example, the gateway control plane entity may generate the processing information of the target signaling packet by means of OM configuration, or the gateway control plane entity may generate the processing information of the target signaling packet based on local user configuration data.

In this embodiment, block 301 may include:

The gateway user plane entity configures the processing information. For example, the gateway user plane entity generates the processing information of the target signaling packet by means of OM configuration, or the gateway user plane entity may generate the processing information of the target signaling packet based on local user configuration data.

In addition, the processing information may be further used to describe an action for forwarding the target signaling packet, where the action includes at least one of the following:

packet receiving, packet sending, encapsulation, or decapsulation.

The processing information may be used to implement at least one processing operation of packet receiving, packet sending, encapsulation, or decapsulation on the target signaling packet.

302. The gateway user plane entity receives the target signaling packet, and processes the target signaling packet based on the processing information.

In this embodiment, after the processing information is obtained, the type information of the target signaling packet that should be received or the destination address to which the gateway user plane entity should send the target signaling packet can be determined, so that the target signaling packet can be received and sent based on the type information and the destination address.

For example, block 302 may include:

The gateway user plane entity receives, based on the type information included in the processing information, the target signaling packet that matches the type information and that is sent by a network entity, and forwards the target signaling packet based on the action included in the processing information, where the network entity includes a gateway control plane entity, an external signaling packet sending entity, or user equipment.

The external signaling packet sending entity may include a network element device, for example, an SGSN network element.

Because a type of a packet that the gateway user plane entity currently should receive can be learned by using the type information, that is, a type of the target signaling packet can be obtained, when the network entity sends the target signaling packet, the target signaling packet can be obtained based on the type information. In addition, the processing information may further include a processing action, so that the gateway user plane entity can directly process the target signaling packet based on the action, for example, send, encapsulate, or decapsulate the target signaling packet.

In addition, the processing information may further include the destination address to which the gateway user plane entity should send the target signaling packet, so that the target signaling packet can be sent to a device corresponding to the destination address directly based on the processing action and the destination address that are included in the processing information. Because the target signaling packet is sent based on the destination address in the processing information, compared with a case that the target signaling packet carries the destination address, the target signaling packet can be more flexibly forwarded in this embodiment.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a Dynamic Host Configuration Protocol DHCP signaling packet that matches the type information and that is sent by the user equipment, and sends the DHCP signaling packet to the gateway control plane entity based on a destination address for sending the DHCP packet and the packet sending action that are included in the processing information, so that the gateway control plane entity generates a DHCP response packet for the DHCP signaling packet.

In addition, the DHCP signaling packet may be further encapsulated. For example, the gateway user plane entity receives the DHCP signaling packet sent by the user equipment, and encapsulates the DHCP signaling packet into a tunnel packet based on the encapsulation action included in the processing information and sends the tunnel packet to the gateway control plane entity, so that the gateway control plane entity decapsulates the tunnel packet to obtain the DHCP signaling packet, and the gateway control plane entity generates the DHCP response packet for the DHCP signaling packet.

It should be noted that, the described tunnel packet provided in any implementation in this embodiment of the present disclosure may include a GTP-C (GTP signaling) packet, a GTP-U (GTP data) packet, or a PMIP packet.

The method may further include the following operation:

Based on the packet receiving action and the encapsulation action that are included in the processing information, the gateway user plane entity receives the DHCP response packet sent by the gateway control plane entity, and encapsulates the DHCP response packet into a tunnel packet and sends the tunnel packet to the user equipment.

In this way, the user equipment and the gateway control plane entity can complete DHCP packet negotiation.

In addition, the method may further include the following operation:

The gateway user plane entity sends, to the gateway control plane entity, an indication message that a signaling packet received by the gateway control plane entity is a DHCP signaling type packet.

Therefore, the gateway control plane entity may determine, based on the indication message, that the received signaling packet is a DHCP signaling type packet. For example, when the signaling packet is sent by using a tunnel packet, the gateway control plane entity may determine, based on the indication message, that the packet carried in the received tunnel packet is a DHCP signaling type packet, so that the gateway control plane entity can quickly identify a DHCP type signaling packet. Certainly, in this embodiment, it may be not necessary to send the indication information. In this case, the gateway control plane entity may decapsulate the tunnel packet to determine that a packet obtained by means of decapsulation is a DHCP signaling packet.

In addition, the method may further include the following operation:

The gateway user plane entity receives an operation instruction that is for performing tunnel packet encapsulation on the DHCP response packet and that is sent by the gateway control plane entity, receives, based on the packet receiving action included in the processing information, the DHCP response packet sent by the gateway control plane entity, and encapsulates the DHCP response packet into the tunnel packet based on the operation instruction and sends the tunnel packet to the user equipment.

In this way, the gateway user plane entity can flexibly forward the packet based on the operation instruction.

In addition, in this implementation, the gateway user plane entity may send the DHCP signaling packet to the gateway control plane entity by using a GTP-C message, that is, forward the DHCP signaling packet to the gateway control plane entity by using the DHCP signaling as an information element in the message. Alternatively, the gateway user plane entity may send the DHCP signaling to the gateway control plane entity by using a GTP-U tunnel, for example, use the DHCP signaling packet as a data packet, and encapsulate a GTP-U header into the data packet and send the data packet to the gateway control plane entity by using the GTP-U tunnel.

Figure 4:
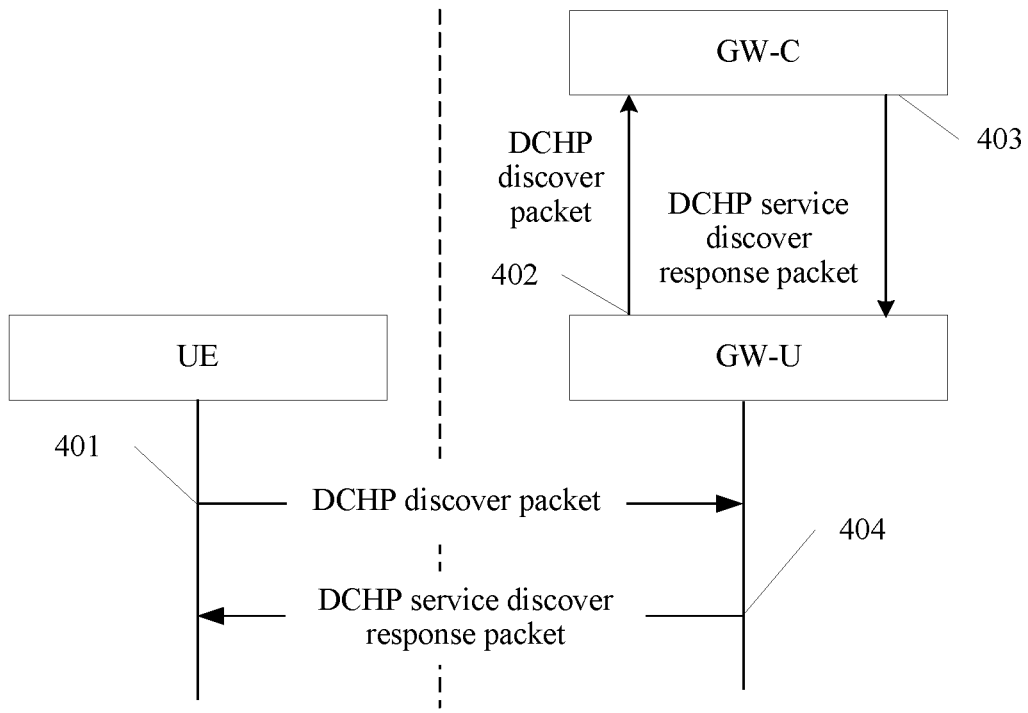
FIG. 4 is a schematic flowchart of another signaling packet processing method according to an embodiment of the present disclosure.

In this implementation, the DHCP signaling packet may be a DHCP discover (DHCP Discover) packet, and the response packet may be a DHCP service discover response (DHCP OFFER) packet. For example, as shown in FIG. 4, the method includes:

401. UE sends a DHCP Discover packet to a gateway user plane entity.

402. The gateway user plane entity forwards the DHCP Discover packet to a gateway control plane entity.

403. The gateway control plane entity sends a DHCP OFFER packet to the gateway user plane entity, where the DHCP OFFER packet is a response packet generated by the gateway control plane entity in response to the DHCP Discover packet.

404. The gateway user plane entity forwards the DHCP Discover packet to the user equipment.

In this implementation, a type of the gateway user plane entity may be a gateway type such as a PGW or an SGW.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, an Internet Key Exchange Protocol IKE signaling packet that matches the type information and that is sent by the user equipment, and sends the IKE signaling packet to the gateway control plane entity based on a destination address for sending the IKE signaling packet and the packet sending action that are included in the processing information, so that the gateway control plane entity generates an IKE response packet for the IKE signaling packet.

In this implementation, the gateway user plane entity can forward the IKE signaling packet to the gateway control plane entity.

The method may further include the following operation:

Based on the packet receiving action and the packet sending action that are included in the processing information, the gateway user plane entity receives the IKE response packet sent by the gateway control plane entity, and forwards the IKE response packet to the user equipment.

In this way, the user equipment and the gateway control plane entity can complete IKE packet negotiation.

In addition, in this embodiment, the method may further include the following operation:

The gateway user plane entity sends, to the gateway control plane entity, an indication message that a packet received by the gateway control plane entity is an IKE signaling type packet.

In this way, the gateway control plane entity can determine, based on the indication message, that the received signaling packet is an IKE signaling packet.

In addition, this embodiment may further include the following operation:

The gateway user plane entity receives an operation instruction that is for directly sending the IKE response packet and that is sent by the gateway control plane entity, receives the IKE response packet based on the packet receiving action included in the processing information, and forwards the IKE response packet to the user equipment based on a destination address for sending the IKE response packet that is included in the operation instruction.

In this way, based on the operation instruction, the gateway user plane entity can flexibly forward the packet based on the operation instruction.

In this implementation, the gateway user plane entity may send the IKE signaling packet to the gateway control plane entity by using a GTP-C message, that is, forward the IKE signaling packet to the gateway control plane entity by using the IKE signaling packet as an information element in the message. Alternatively, the gateway user plane entity may send the IKE signaling packet to the gateway control plane entity by using a GTP-U tunnel, for example, use the IKE signaling packet as a data packet, and encapsulate a GTP-U header into the data packet and send the data packet to the gateway control plane entity by using the GTP-U tunnel.

Figure 5:
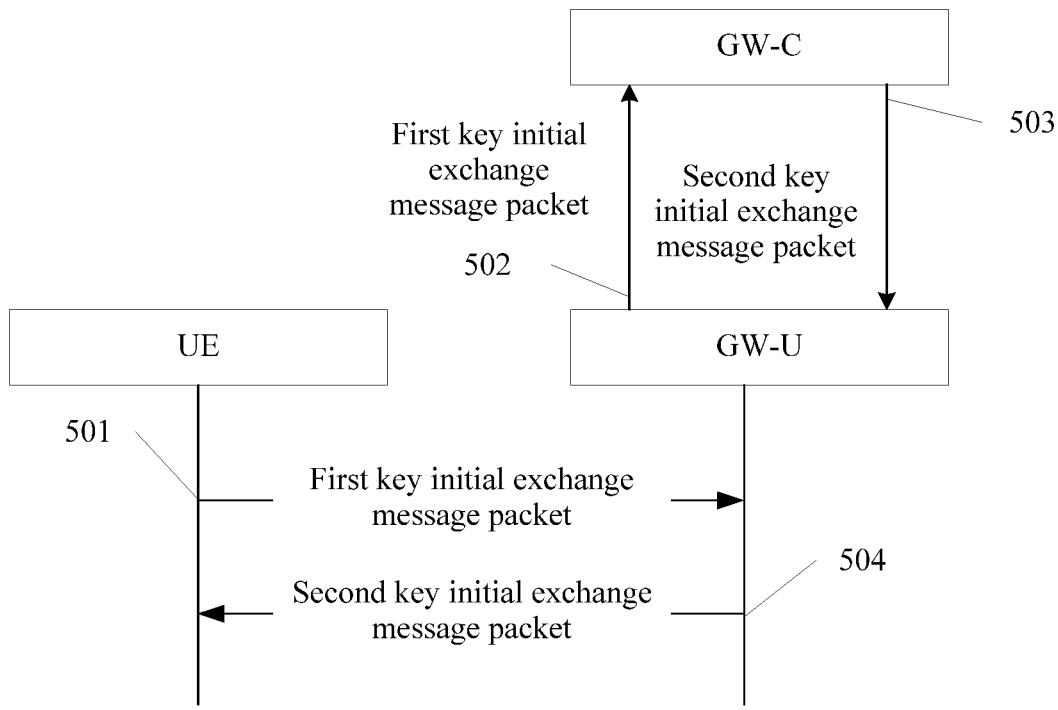
FIG. 5 is a schematic flowchart of another signaling packet processing method according to an embodiment of the present disclosure.

In this implementation, the IKE signaling packet may include an IKEv2 negotiation packet, for example, a key initial exchange message (IKE-SA-INIT) packet or a key authentication exchange (IKE-AUTH) message packet. For example, as shown in FIG. 5, the method includes:

501. UE sends a first IKE-SA-INIT packet to a gateway user plane entity.

502. The gateway user plane entity forwards the first IKE-SA-INIT packet to a gateway control plane entity.

503. The gateway control plane entity sends a second IKE-SA-INIT packet to the gateway user plane entity, where the second IKE-SA-INIT packet is a response packet generated by the gateway control plane entity in response to the first IKE-SA-INIT packet.

504. The gateway user plane entity forwards the second IKE-SA-INIT to the user equipment.

In addition, when receiving the IKE signaling packet or the DHCP signaling packet, the gateway control plane entity can respond to the IKE signaling packet or the DHCP signaling packet. Responding to the IKE signaling packet or the DHCP signaling packet is common knowledge of a person skilled in the art, and details are not described herein. In addition, after the gateway control plane entity responds to a target signaling packet, a generated response packet may be sent to the gateway user plane entity by using an S18 interface.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a PBU packet that matches the type information and that is sent by the gateway control plane entity, where the PBU packet is generated by the gateway control plane entity; and the gateway user plane entity sends the PBU packet to the peer gateway based on a destination address for sending the PBU packet and the packet sending action that are included in the processing information, where a source address of the PBU packet forwarded to the peer gateway is an address of the gateway user plane entity.

That the source address of the PBU packet is the address of the gateway user plane entity may be that when generating the PBU packet, the gateway control plane entity sets the source address of the PBU packet as the address of the gateway user plane entity. Alternatively, the gateway control plane entity may instruct the gateway user plane entity to set the source address of the PBU packet as the address of the gateway user plane entity.

The method may further include the following operation:

The gateway user plane entity receives a PBA that is sent by the peer gateway and that is generated in response to the PBU packet, and sends the PBA packet to the gateway control plane entity based on a destination address for sending the PBA packet and the packet sending action that are included in the processing information, so that the gateway control plane entity responds to the PBA packet.

In this implementation, the peer gateway may also include a gateway control plane entity and a gateway user plane entity. Therefore, block 302 may be sending the PBU packet to the gateway user plane entity of the peer gateway and receiving the PBA packet sent by the gateway user plane entity of the peer gateway. Certainly, the PBA packet may be generated by the gateway control plane entity of the peer gateway.

In this embodiment, the method may further include the following operation:

The gateway user plane entity receives an operation instruction that is for directly sending a PBU packet and that is sent by the gateway control plane entity.

The operation that the gateway user plane entity receives the target signaling packet, and processes the target signaling packet based on the processing information includes:

The gateway user plane entity receives, based on the type information included in the processing information, a proxy binding update PBU packet that matches the type information and that is sent by the gateway control plane entity, where the PBU packet is generated by the gateway control plane entity; and the gateway user plane entity sends the PBU packet to the peer gateway based on a destination address for sending the PBU packet that is included in the processing information and the operation instruction, where a source address of the PBU packet forwarded to the peer gateway is an address of the gateway user plane entity.

The method may further include:

The gateway user plane entity receives a PBA packet that is sent by the peer gateway and that is generated in response to the PBU packet, and sends the PBA packet to the gateway control plane entity based on a destination address for sending the PBA packet and the packet sending action that are included in the processing information, so that the gateway control plane entity responds to the PBA packet.

Certainly, in this implementation, the PBU packet can be forwarded based on the operation instruction delivered by the gateway control plane entity, so that the PBU packet can be more flexibly processed.

Figure 6:
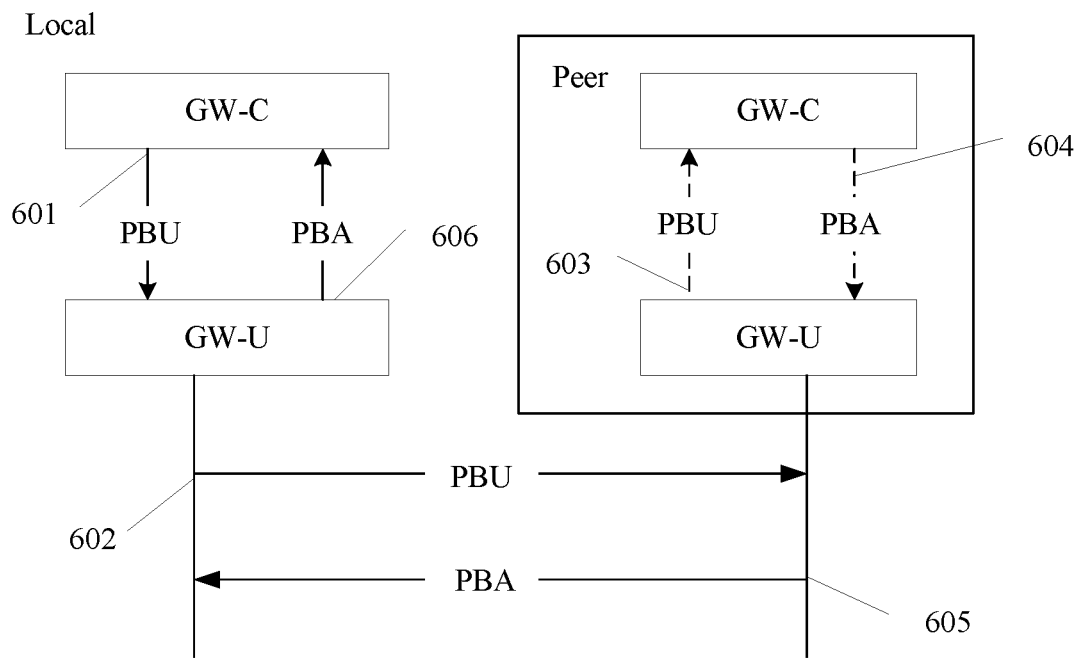
FIG. 6 is a schematic flowchart of another signaling packet processing method according to an embodiment of the present disclosure.

In addition, in the implementation, when receiving the PBU packet, the gateway control plane entity of the peer gateway can perform related processing, so as to generate a PBA packet of a PMIP negotiation response packet. In addition, after receiving the PBA packet, a local gateway control plane entity performs related processing, so as to complete a PMIP negotiation procedure. For example, as shown in FIG. 6, the method includes:

601. A local gateway control plane entity sends a PBU packet to a local gateway user plane entity.

602. The local gateway user plane entity forwards the PBU packet to a peer gateway user plane entity.

603. The peer gateway user plane entity forwards the PBU packet to a peer gateway control plane entity.

604. The peer gateway control plane entity forwards a PBA packet to the peer gateway user plane entity, where the PBA packet is a response packet generated by the peer gateway control plane entity in response to the PBU packet.

605. The peer gateway user plane entity forwards the PBA packet to the local gateway user plane entity.

606. The local gateway user plane entity forwards the PBA packet to the local gateway control plane entity.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, an Extensible Authentication Protocol EAP signaling packet that matches the type information and that is sent by the user equipment, and sends the EAP signaling packet to the gateway control plane entity based on a destination address for sending the EAP signaling packet and the packet sending action that are included in the processing information, so that the gateway control plane entity generates an EAP response packet for the EAP signaling packet.

In this implementation, the EAP signaling packet can be flexibly forwarded.

In this implementation, the method may further include the following operation:

Based on the packet receiving action and the packet sending action that are included in the processing information, the gateway user plane entity receives the EAP response packet sent by the gateway control plane entity, and forwards the EAP response packet to the user equipment.

In this implementation, EAP signaling packet negotiation can be flexibly implemented between the user equipment and the gateway control plane entity.

In addition, this embodiment may further include the following operation:

The gateway user plane entity sends, to the gateway control plane entity, an indication message that a packet received by the gateway control plane entity is the EAP signaling type packet.

In addition, this embodiment may further include the following operation:

The gateway user plane entity receives an operation instruction that is for directly sending the EAP response packet and that is sent by the gateway control plane entity, receives the EAP response packet based on the packet receiving action included in the processing information, and forwards the EAP response packet to the user equipment based on a destination address for sending the EAP response packet that is included in the operation instruction.

In this implementation, the EAP signaling packet can be flexibly processed based on the operation instruction delivered by the gateway control plane entity.

Figure 7:
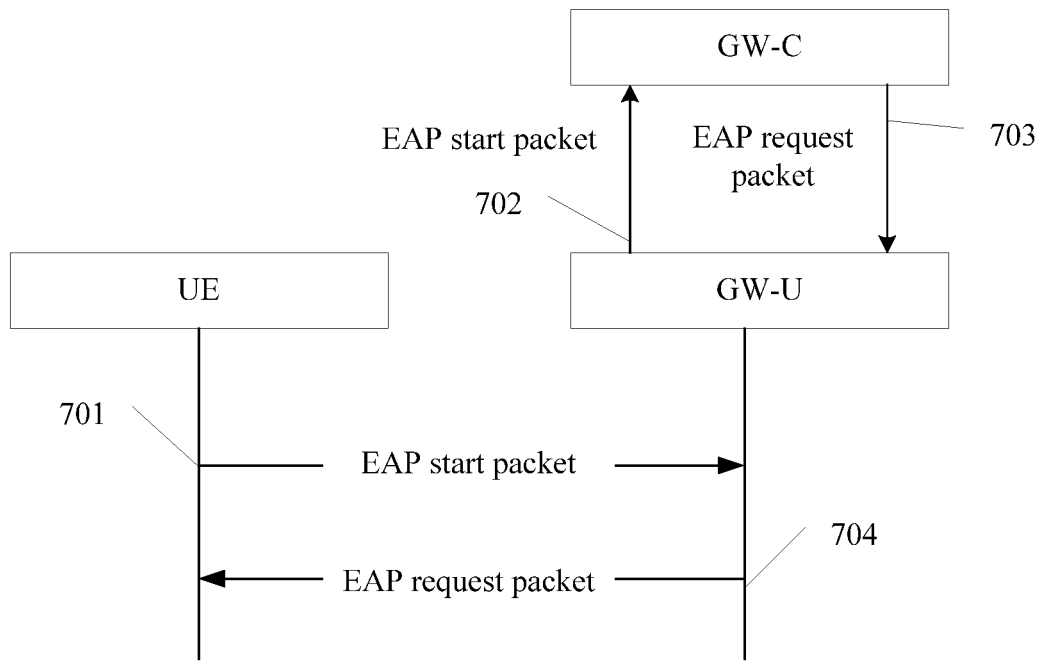
FIG. 7 is a schematic flowchart of another signaling packet processing method according to an embodiment of the present disclosure.

In the implementation, the EAP signaling packet may be an EAP negotiation signaling packet, such as an EAP start EAP-START packet. In addition, when responding to the EAP negotiation signaling packet, the gateway control plane entity may generate an EAP response packet, such as an EAP request EAP-REQUEST packet. For example, as shown in FIG. 7, the method includes:

701. UE sends an EAP-START packet to a gateway user plane entity.

702. The gateway user plane entity forwards the EAP-START packet to a gateway control plane entity.

703. The gateway control plane entity sends an EAP-REQUEST packet to the gateway user plane entity, where the EAP-REQUEST packet is a response packet generated by the gateway control plane entity in response to the EAP-START packet.

704. The gateway user plane entity forwards the EAP-REQUEST packet to the user equipment.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a tunnel packet that matches the type information and that is sent by the user equipment, decapsulates, based on the packet decapsulation action included in the processing information, the tunnel packet to obtain a Point-to-Point Protocol PPP signaling packet, and forwards the PPP signaling packet to the gateway control plane entity based on a destination address for sending the PPP signaling packet and the packet sending action that are included in the processing information, so that the gateway control plane entity generates a PPP response packet for the PPP signaling packet.

In this implementation, the PPP signaling packet can be flexibly forwarded.

In addition, in this implementation, the method may further include the following operation:

Based on the packet receiving action and the encapsulation action that are included in the processing information, the gateway user plane entity receives the PPP response packet sent by the gateway control plane entity, and encapsulates the PPP response packet into a tunnel packet and sends the tunnel packet to the user equipment.

In this way, PPP signaling packet negotiation can be flexibly implemented between the user equipment and the gateway control plane entity.

In addition, this embodiment may further include the following operation:

The gateway user plane entity sends, to the gateway control plane entity, an indication message that a packet received by the gateway control plane entity is the PPP signaling type packet.

In addition, this embodiment may further include the following operation:

The gateway user plane entity receives an operation instruction that is for performing tunnel packet encapsulation on the PPP response packet and that is sent by the gateway control plane entity, receives the PPP response packet based on the packet receiving action included in the processing information, and encapsulates the PPP response packet into a tunnel packet and sends the tunnel packet to the user equipment based on a destination address for sending the PPP response packet that is included in the operation instruction.

In this implementation, the PPP response packet can be flexibly forwarded by using the operation instruction.

Figure 8:
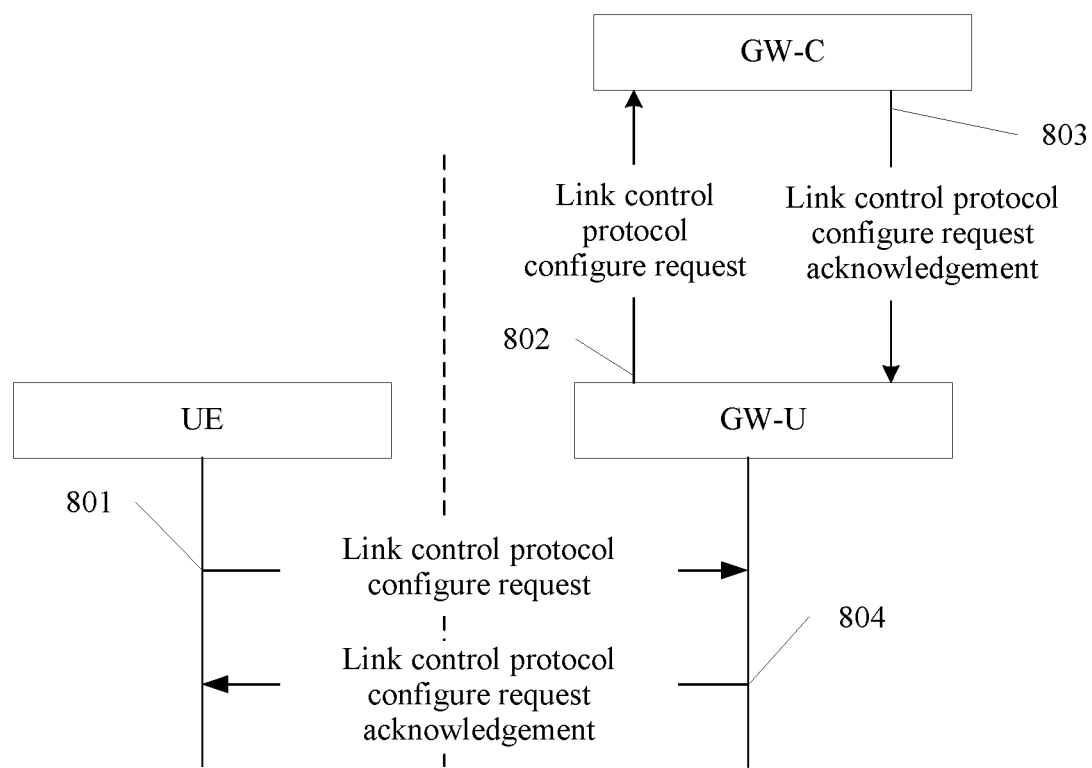
FIG. 8 is a schematic flowchart of another signaling packet processing method according to an embodiment of the present disclosure.

In this implementation, the PPP signaling packet may be a link control protocol configure request (LCP Configure Request) packet, and the PPP response packet may be a link control protocol configure request acknowledgement (LCP Configure Request Acknowledgement) packet. For example, as shown in FIG. 8, the method includes:

801. UE sends an LCP Configure Request packet to a gateway user plane entity.

802. The gateway user plane entity forwards the LCP Configure Request packet to a gateway control plane entity.

803. The gateway control plane entity sends an LCP Configure Request Acknowledgement packet to the gateway user plane entity, where the LCP Configure Request Acknowledgement packet is a response packet generated by the gateway control plane entity in response to the LCP Configure Request packet.

804. The gateway user plane entity forwards the LCP Configure Request Acknowledgement packet to the user equipment.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a tunnel packet that matches the type information and that is sent by the user equipment, decapsulates, based on the packet decapsulation action included in the processing information, the tunnel packet to obtain a PPP signaling packet, and forwards the PPP signaling packet to the gateway control plane entity based on a destination address for sending the PPP signaling packet and the packet sending action that are included in the processing information, so that the gateway control plane entity triggers a tunnel creation procedure based on the PPP signaling packet.

In this implementation, the gateway control plane entity can be flexibly triggered to perform the tunnel creation procedure, where the tunnel creation procedure may be performed between the gateway control plane entity and the user equipment.

The method may further include the following operations:

Based on the packet receiving action and the encapsulation action that are included in the processing information, the gateway user plane entity receives the PPP signaling packet that is sent by the gateway control plane entity and whose destination address is an address of the authentication server, and encapsulates the PPP signaling packet whose destination address is the address of the authentication server into the tunnel packet and sends the tunnel packet to the authentication server, so that the authentication server generates a PPP response packet for the PPP signaling packet; and the gateway user plane entity receives, based on the type information included in the processing information, a tunnel packet that matches the type information, that carries the PPP response packet, and that is sent by the authentication server, and based on the encapsulation action and the decapsulation action that are included in the processing information, decapsulates the tunnel packet so as to obtain the PPP response packet, and encapsulates the PPP response packet into a tunnel packet and sends the tunnel packet to the user equipment.

In this implementation, PPP signaling packet negotiation can be flexibly implemented between the user equipment and the authentication server.

In addition, in this implementation, the method may further include the following operations:

The gateway user plane entity receives an operation instruction that is for performing tunnel packet encapsulation on the PPP signaling packet and a PPP response packet and that is sent by the gateway control plane entity;

the gateway user plane entity receives, based on the packet receiving action included in the processing information, the PPP signaling packet that is sent by the gateway control plane entity and whose destination address is an address of the authentication server, encapsulates the PPP signaling packet whose destination address is the address of the authentication server into the tunnel packet based on the operation instruction, and sends the tunnel packet to the authentication server, so that the authentication server generates a PPP response packet for the PPP signaling packet; and the gateway user plane entity receives, based on the type information included in the processing information, a tunnel packet that matches the type information, that carries the PPP response packet, and that is sent by the authentication server, decapsulates the tunnel packet based on the operation instruction so as to obtain the PPP response packet, and encapsulates the PPP response packet into a tunnel packet based on a destination address for sending the PPP response packet that is included in the operation instruction, and sends the tunnel packet to the user equipment.

In this implementation, the PPP signaling packet can be flexibly forwarded based on the operation instruction.

In addition, in this implementation, a signaling packet may be forwarded by using an encrypted tunnel between the gateway user plane entity and the authentication server, that is, the signaling packet may be encrypted during forwarding.

Figure 9:
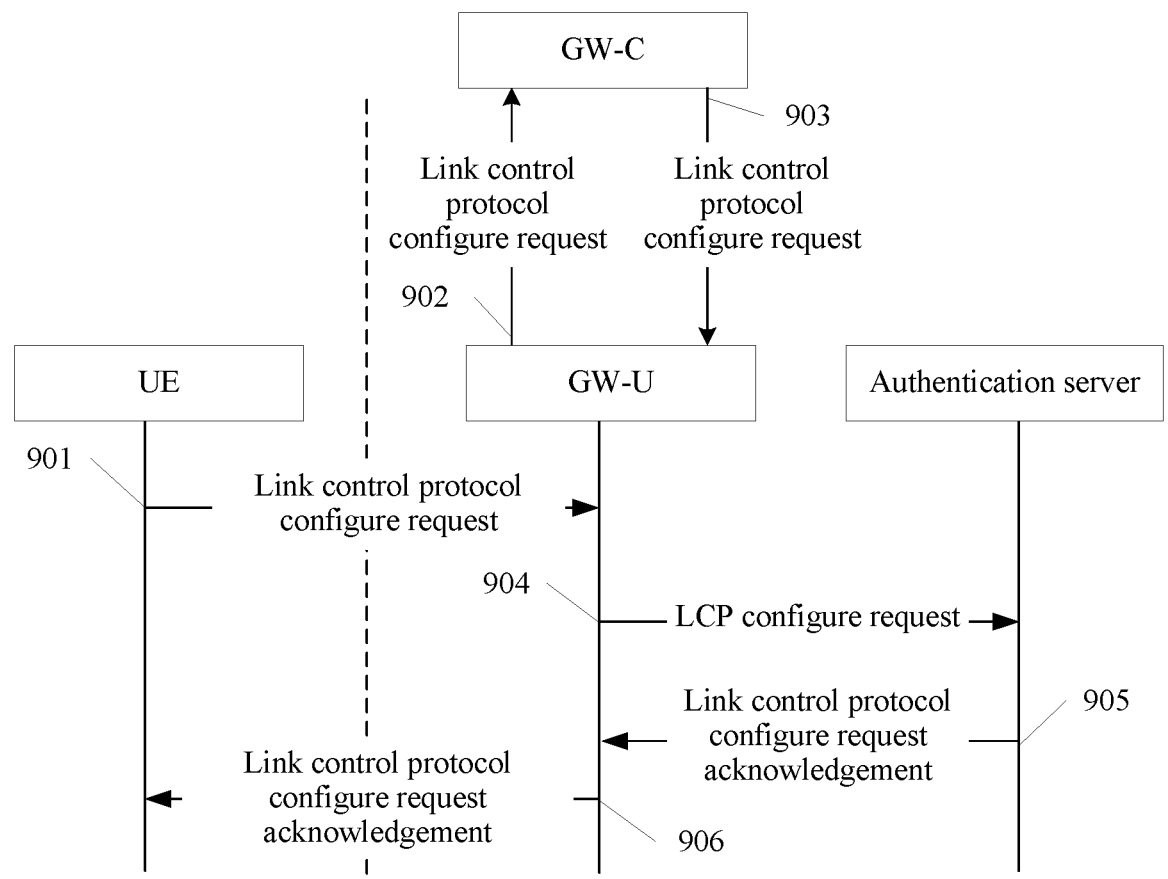
FIG. 9 is a schematic flowchart of another signaling packet processing method according to an embodiment of the present disclosure.

In this implementation, the PPP signaling packet may be an LCP Configure Request packet, and the PPP response packet may be an LCP Configure Request Acknowledgement packet. For example, as shown in FIG. 9, the method includes:

901. UE sends an LCP Configure Request packet to a gateway user plane entity.

902. The gateway user plane entity forwards the LCP Configure Request packet to a gateway control plane entity.

903. The gateway control plane entity sends an LCP Configure Request packet whose destination address is an address of an authentication server to the gateway user plane entity.

904. The gateway user plane entity sends the LCP Configure Request packet whose destination address is the address of the authentication server to the authentication server.

905. The gateway user plane entity receives an LCP Configure Request Acknowledgement packet sent by the authentication server.

906. The gateway user plane entity forwards the LCP Configure Request Acknowledgement packet to the UE.

The authentication server may be an LNS server.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a PPP signaling packet that matches the type information and that is sent by the gateway control plane entity; and based on the encapsulation action, the packet sending action, and a destination address for sending the PPP signaling packet that are included in the processing information, the gateway user plane entity encapsulates the PPP signaling packet into a tunnel packet, and sends the tunnel packet to the authentication server, so that the authentication server generates a PPP response packet for the PPP signaling packet.

The method further includes:

Based on the packet receiving action and the decapsulation action that are included in the processing information, the gateway user plane entity receives a tunnel packet that carries the PPP response packet and that is sent by the authentication server, decapsulates the tunnel packet that carries the PPP response packet, so as to obtain the PPP response packet, and sends the PPP response packet to the gateway control plane entity, so that the gateway control plane entity responds to the PPP response packet.

In this implementation, the PPP signaling packet sent by the gateway control plane entity may be a PPP signaling packet sent after a tunnel is created. Tunnel creation herein may be tunnel creation triggered when the gateway control plane entity receives the PPP signaling packet sent by the gateway user plane entity in the foregoing implementation. Alternatively, tunnel creation may be tunnel creation performed by the gateway control plane entity in another case. This is not limited herein.

In addition, in this implementation, the method may further include the following operation:

The gateway user plane entity sends, to the gateway control plane entity, an indication message that a packet received by the gateway control plane entity is the PPP signaling type packet.

In this embodiment, the method may further include the following operation:

The gateway user plane entity receives an operation instruction that is for performing tunnel packet encapsulation on a PPP signaling packet and that is sent by the gateway control plane entity; and that the gateway user plane entity receives the target signaling packet, and processes the target signaling packet based on the processing information includes:

The gateway user plane entity receives, based on the type information included in the processing information, a PPP signaling packet that matches the type information and that is sent by the gateway control plane entity; and the gateway user plane entity encapsulates the PPP signaling packet into a tunnel packet based on a destination address for sending the PPP signaling packet that is included in the operation instruction, and sends the tunnel packet to the authentication server, so that the authentication server generates a PPP response packet for the PPP signaling packet.

The method may further include:

Based on the packet receiving action and the decapsulation action that are included in the processing information, the gateway user plane entity receives a tunnel packet that carries the PPP response packet and that is sent by the authentication server, decapsulates the tunnel packet that carries the PPP response packet, so as to obtain the PPP response packet, and sends the PPP response packet to the gateway control plane entity, so that the gateway control plane entity responds to the PPP response packet.

Certainly, in this implementation, the PPP signaling packet can be flexibly forwarded based on the operation instruction.

Figure 10:
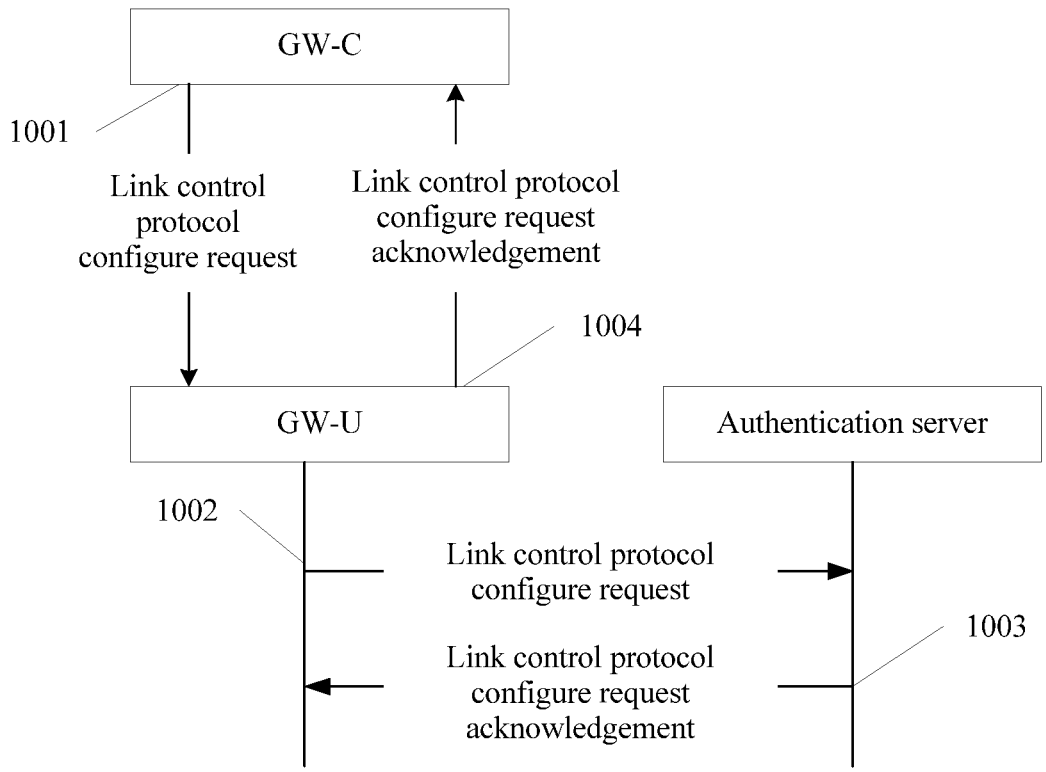
FIG. 10 is a schematic flowchart of another signaling packet processing method according to an embodiment of the present disclosure.

In the implementation, the PPP signaling packet may be an LCP Configure Request packet, and the PPP response packet may be an LCP Configure Request Acknowledgement packet. As shown in FIG. 10, the method includes:

1001. A gateway control plane entity generates an LCP Configure Request packet and sends the LCP Configure Request packet to a gateway user plane entity.

1002. The gateway user plane entity forwards the LCP Configure Request packet to an authentication server.

1003. The gateway user plane entity receives an LCP Configure Request Acknowledgement packet sent by the authentication server.

1004. The gateway user plane entity sends the LCP Configure Request Acknowledgement packet to the gateway control plane entity, so that the gateway control plane entity responds to the packet.

In this embodiment, the operation that the gateway user plane entity receives the target signaling packet delivered by a gateway control plane entity, and forwards the target signaling packet based on a processing procedure corresponding to the processing information may include:

The gateway user plane entity receives, based on the type information included in the processing information, a Layer 2 Tunneling Protocol L2TP signaling packet that matches the type information and that is sent by the gateway control plane entity, where the L2TP signaling packet is generated by the gateway control plane entity; and the gateway user plane entity sends the L2TP signaling packet to the authentication server based on the packet sending action and a destination address for sending the L2TP signaling packet that are included in the processing information, where a source address of the L2TP signaling packet forwarded to the authentication server is an address of the gateway user plane entity.

The method further includes:

Based on the packet receiving action and the packet sending action that are included in the processing information, the gateway user plane entity receives an L2TP response packet that is sent by the authentication server and that is for responding to the L2TP signaling packet, and sends the L2TP response packet to the gateway control plane entity, so that the gateway control plane entity responds to the L2TP response packet.

In this implementation, the L2TP packet can be flexibly forwarded.

In addition, in this implementation, the method may further include the following operation:

The gateway user plane entity sends, to the gateway control plane entity, an indication message that a packet received by the gateway control plane entity is the L2TP response packet.

In this embodiment, the method may further include the following operation:

The gateway user plane entity receives an operation instruction that is for directly sending the L2TP signaling packet and that is sent by the gateway control plane entity.

That the gateway user plane entity receives the target signaling packet, and processes the target signaling packet based on the processing information includes:

The gateway user plane entity receives, based on the type information included in the processing information, a Layer 2 Tunneling Protocol L2TP signaling packet that matches the type information and that is sent by the gateway control plane entity, where the L2TP signaling packet is generated by the gateway control plane entity; and the gateway user plane entity sends the L2TP signaling packet to the authentication server based on a destination address for sending the L2TP signaling packet that is included in the operation instruction, where a source address of the L2TP signaling packet forwarded to the authentication server is an address of the gateway user plane entity.

The method further includes:

Based on the packet receiving action and the packet sending action that are included in the processing information, the gateway user plane entity receives an L2TP response packet that is sent by the authentication server and that is for responding to the L2TP signaling packet, and sends the L2TP response packet to the gateway control plane entity, so that the gateway control plane entity responds to the L2TP response packet.

In this implementation, the L2TP packet can be flexibly forwarded based on the operation instruction.

In addition, in the implementation, a signaling packet may be forwarded by using an encrypted tunnel between the gateway user plane entity and the authentication server, that is, the signaling packet may be encrypted during forwarding.

In this implementation, the gateway user plane entity forwards the signaling negotiation packet to the authentication server by using the forwarding procedure for the L2TP signaling packet that is described in block 302, so that the gateway implements functions such as establishment, maintenance, and teardown of an encrypted tunnel.

Figure 11:
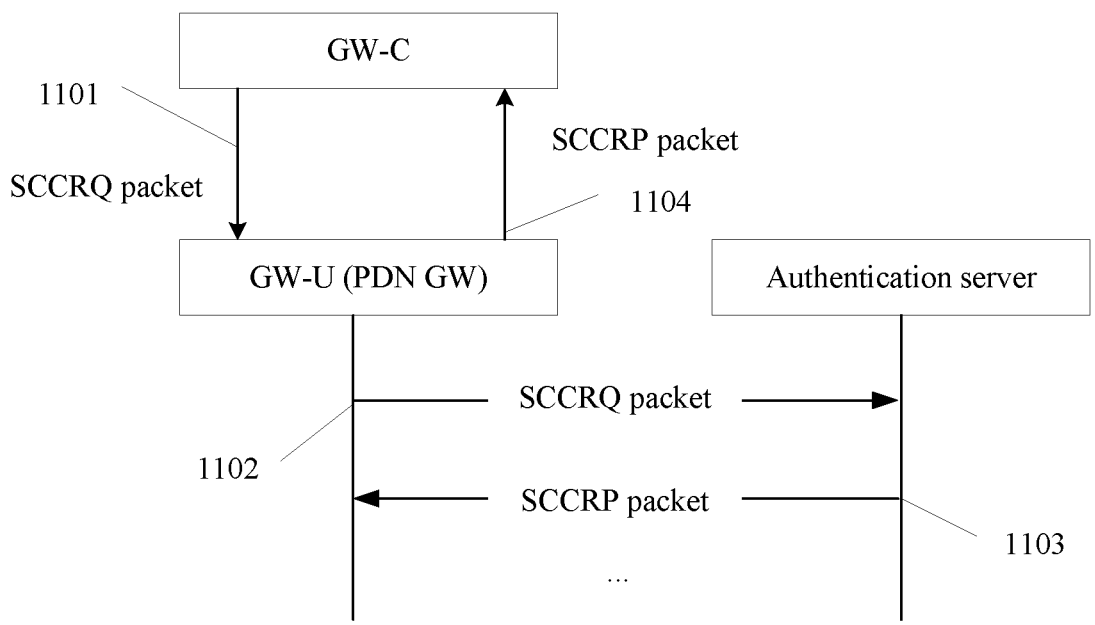
FIG. 11 is a schematic flowchart of another signaling packet processing method according to an embodiment of the present disclosure.

In this implementation, the L2TP signaling packet may be further an L2TP signaling packet generated when the gateway control plane entity receives a create default bearer request message sent by a user side. The L2TP signaling packet may be a control packet, for example, a start control connection request (SCCRQ) packet, and the L2TP response packet may be a start control connection reply (SCCRP) packet. As shown in FIG. 11, the method includes:

1101. A gateway control plane entity generates a Start Control Connection Request packet and sends the Start Control Connection Request packet to a gateway user plane entity.

1102. The gateway user plane entity forwards the Start Control Connection Request packet to an authentication server.

1103. The gateway user plane entity receives a Start Control Connection Reply packet sent by the authentication server.

1104. The gateway user plane entity sends the Start Control Connection Reply packet to the gateway control plane entity, so that the gateway control plane entity responds to the packet.

In this embodiment, the operation that the gateway user plane entity receives, based on the type information included in the processing information, the target signaling packet that matches the type information and that is sent by a network entity, and forwards the target signaling packet based on the action included in the processing information may include:

The gateway user plane entity receives, based on the type information included in the processing information, a GTP-C signaling type packet that matches the type information and that is sent by a network element device, and sends the GTP-C signaling type packet to the gateway control plane entity based on a destination address for sending the GTP-C signaling type packet and the packet sending action that are included in the processing information, so that the gateway control plane entity generates a GTP-C response packet for the GTP-C signaling type packet, where a destination TEID of the GTP-C response packet is a TEID of an interface between the network element device and the gateway user plane entity.

The method may further include:

The gateway user plane entity receives, based on the packet receiving action included in the processing information, the GTP-C response packet sent by the gateway control plane entity, and forwards the GTP-C response packet to the network element device.

In this implementation, the method may further include the following operation:

The gateway user plane entity sends, to the gateway control plane entity, an indication message that a packet received by the gateway control plane entity is the GTP-C signaling type packet.

In this implementation, the method may further include the following operation:

The gateway user plane entity receives an operation instruction that is for directly sending the GTP-C response packet and that is sent by the gateway control plane entity.

That the gateway user plane entity forwards the GTP-C response packet to the network element device includes:

The gateway user plane entity forwards the GTP-C response packet to the network element device based on a destination address for sending the GTP-C response packet that is included in the operation instruction.

In this implementation, the GTP-C packet can be flexibly forwarded.

Figure 12:
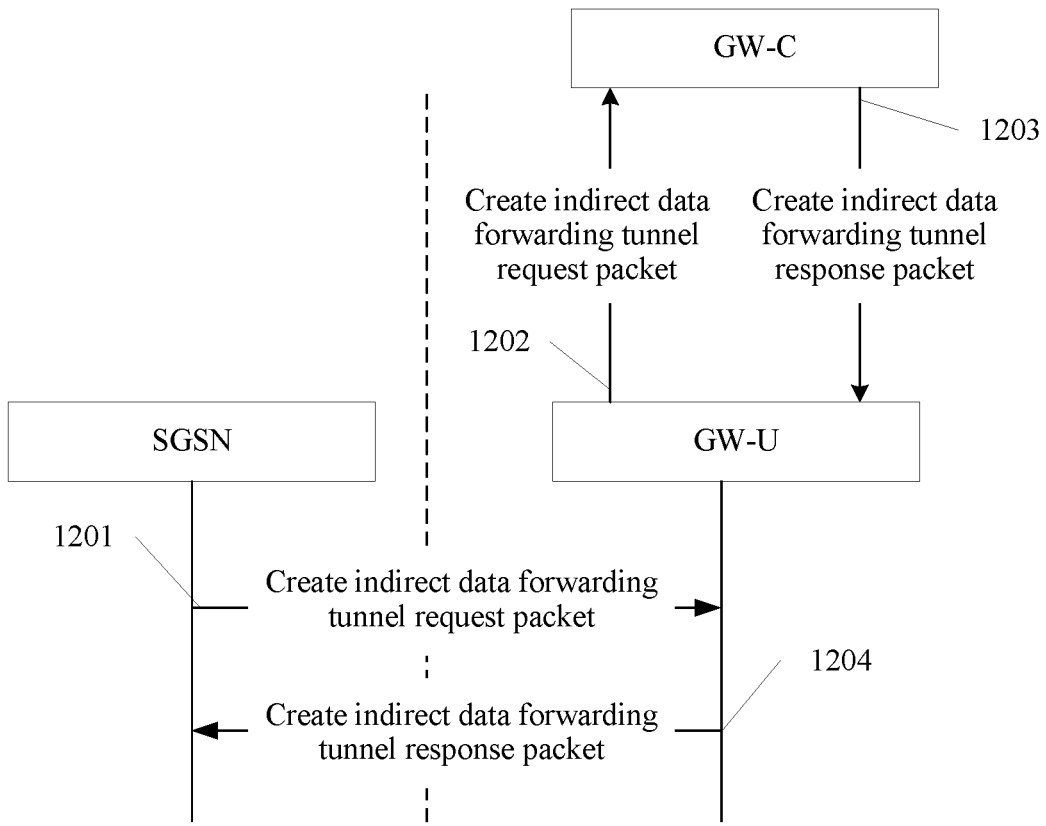
FIG. 12 is a schematic flowchart of another signaling packet processing method according to an embodiment of the present disclosure.

In addition, in this implementation, the GTP-C signaling type packet may be a create indirect data forwarding tunnel request (Create Indirect Data Forwarding Tunnel Request) packet, and the GTP-C response packet may be a create indirect data forwarding tunnel response (Create Indirect Data Forwarding Tunnel Response) packet. For example, as shown in FIG. 12, the method includes:

1201. An SGSN sends a Create Indirect Data Forwarding Tunnel Request packet to a gateway user plane entity.

1202. The gateway user plane entity forwards the Create Indirect Data Forwarding Tunnel Request packet to a gateway control plane entity.

1203. The gateway control plane entity sends a Create Indirect Data Forwarding Tunnel Response packet to the gateway user plane entity.

1204. The gateway user plane entity forwards the Create Indirect Data Forwarding Tunnel Response packet to the SGSN.

In this implementation, a type of the gateway user plane entity may be a gateway type such as a PGW or an SGW.

In this implementation, when sending the GTP-C response packet to the gateway user plane entity, the gateway control plane entity may further send indication information indicating a packet type to the gateway user plane entity, for example, an indication message used to indicate that a current packet is a GTP-C type signaling packet. In addition, if an S18 interface uses the GTP protocol, the response packet may be sent to the gateway user plane entity by using a GTP-C message. That is, the GTP-C response packet is used as an information element in the message for sending. Alternatively, the response packet may be sent to the gateway user plane entity by using a GTP-U tunnel. That is, the GTP-C response packet is used as a data packet into which a GTP-U header is encapsulated, and sent to the gateway user plane entity by using the GTP-U tunnel.

In this embodiment, a plurality of optional implementations are added based on the embodiment shown in FIG. 2, and all can reduce network costs.

Figure 13:
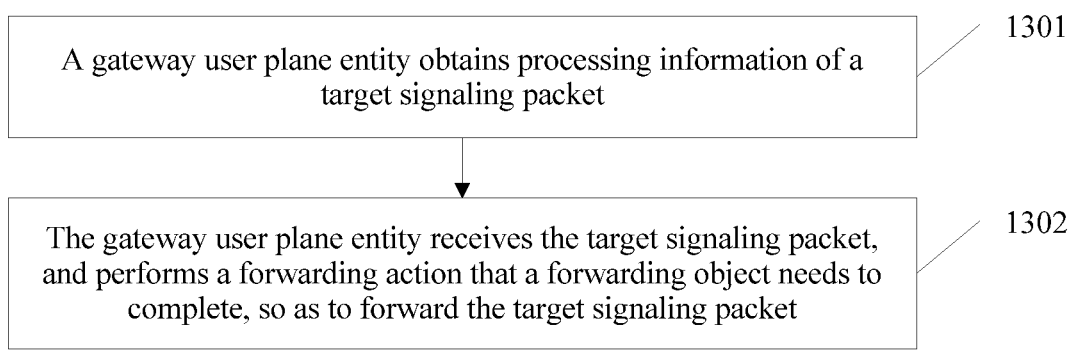
FIG. 13 is a schematic flowchart of another signaling packet processing method according to an embodiment of the present disclosure.

Referring to FIG. 13, FIG. 13 is a schematic flowchart of another signaling packet processing method based on an embodiment of the present disclosure. As shown in FIG. 13, the method includes the following operations.

1301. A gateway user plane entity obtains processing information of a target signaling packet, where the processing information includes a forwarding object, the forwarding object includes an attribute and a forwarding action that the forwarding object should complete, the attribute is used to describe a characteristic of the forwarding object, and the forwarding action is used to describe a function of the forwarding object.

In this embodiment, when the target signaling packet is a signaling packet of user equipment, the processing information may be processing information created by the gateway control plane entity for the target signaling packet of the user equipment. For example, a gateway control plane entity may create the processing information of the target signaling packet of the user equipment based on an access status of the user equipment. Specifically, the processing information of the target signaling packet may be created for the user equipment based on an access mode or subscription information of the user equipment. For example, the processing information of the target signaling packet of the user equipment may be generated by means of local configuration or OM configuration; or the processing information of the target signaling packet of the user equipment may be generated by using a correspondence between an access status and processing information.

In addition, no limitation is imposed on the user equipment in this embodiment, the user equipment may be any user equipment that performs signaling packet transmission with a gateway, and the target signaling packet may be a signaling packet sent by the user equipment, or may be a signaling packet sent by the gateway to the user equipment.

In addition, the forwarding object may refer to an abstract expression of a type of entity that has a specific function and attribute, the forwarding object may be instantiated before being used, and the forwarding object may be assigned some actions and attributes by means of instantiation. That the gateway control plane entity creates a forwarding object means that the gateway control plane entity should specify an attribute of the forwarding object and an action that the forwarding object should complete. The attribute is used to describe a characteristic of the forwarding object, and the action is used to describe a function of the forwarding object.

For example, a signaling packet forwarding function may be decomposed into several minimum execution functions, each minimum execution function may be referred to as an atomic action, and the atomic action may be understood as the forwarding action. In this embodiment, the forwarding object may include any one or more of the following:

a link object (Link), a bearer object (Bearer), or a forwarding plane control object (UController).

The link object may be used to receive a packet that matches an attribute of the link object, and complete packet decapsulation. In addition, when a signaling packet is decapsulated, decapsulation-related information (for example, an SPI and key information corresponding to the SPI) may be provided by the gateway control plane entity. In addition, as defined by the gateway control plane entity, the link object may forward the signaling packet to the bearer object. For example, the gateway control plane entity defines that the signaling packet may be sent to a corresponding object based on a GRE key/a TEID of the signaling packet. If the TEID of the signaling packet is matched, the signalling packet is sent to the bearer object, and the like.

The bearer object may be used to receive a packet that matches an attribute of the bearer object, and complete packet-related encapsulation. In addition, packet type information used by an encapsulation action may be provided by the gateway control plane entity.

The forwarding plane control object may be used to receive and send a message from the gateway control plane entity.

In this embodiment, the forwarding action may include any one or more of the following:

a first forwarding action (PacketMatch), a second forwarding action (EventReport), a third forwarding action (Encapsulate), a fourth forwarding action (Decapsulate), a fifth forwarding action (SendPacket), a sixth forwarding action (Encrypt), or a seventh forwarding action (Decrypt).

The first forwarding action is used to receive a signaling packet that should be uploaded to a control plane, used to receive a response packet delivered by a control packet, or used to identify a packet protocol type; for example, may receive, based on an attribute of a forwarding object, a signaling packet that matches the attribute.

The second forwarding action is used to encapsulate signaling packet type information into a packet. The packet type information may be obtained by performing the first forwarding action, and the information may further include event type information (for example, Signaling In).

The third forwarding action is used to encapsulate a packet, for example, may encapsulate a signaling packet based on an attribute of a forwarding object. A parameter used by the forwarding action may be the attribute of the object, including: a signaling packet encapsulation type (for example, GTP-C) and an endpoint value (for example, a control plane TEID and an IP address of the gateway control plane entity).

The fourth forwarding action is used to decapsulate a packet, for example, may decapsulate a signaling packet based on an attribute of a forwarding object, including: a decapsulation type (for example, GTP-C) of the signaling packet.

The fifth forwarding action is used to send a packet to a destination network entity, for example, may send a packet to a corresponding destination network entity based on information (for example, a destination IP address) that is delivered by the gateway control plane entity and that is used to perform the action.

The sixth forwarding action is used to encrypt a packet, for example, may encrypt the packet based on information (such as an SPI and a key corresponding to the SPI) that is delivered by the gateway control plane entity and that is used to perform the action.

The seventh forwarding action is used to decrypt a packet, for example, may decrypt a data packet based on information (such as an SPI and a key corresponding to the SPI) that is delivered by the gateway control plane entity and that is used to perform the action.

The foregoing enumerated forwarding objects and forwarding actions are only examples, and cannot be used to limit the present disclosure. In this embodiment of the present disclosure, another possible object, attribute, and atomic action may also be defined by using a gateway controller 201, provided that a service can be provided for data packet forwarding.

1302. The gateway user plane entity receives the target signaling packet, and performs the forwarding action that the forwarding object should complete, so as to forward the target signaling packet.

After receiving the processing information, the gateway user plane entity may perform the forwarding action that the forwarding object should complete, so as to forward the target signaling packet.

In this embodiment, the processing information may include the bearer object and the forwarding plane control object, the bearer object should complete the first forwarding action, and the forwarding plane control object should complete the fifth forwarding action.

Block 1302 may include:

The gateway user plane entity performs the first forwarding action that the bearer object should complete, so as to identify a first target signaling packet that matches the attribute of the bearer object and that is sent by user equipment; and the gateway user plane entity performs the fifth forwarding action that the forwarding plane control object should complete, so as to forward the first target signaling packet to the gateway control plane entity.

In this implementation, information used for performing the first forwarding action that the bearer object should complete may include a packet protocol type. The packet protocol type may be delivered by the gateway control plane entity, and an attribute of the forwarding plane control object may include an IP address of the gateway control plane entity.

In addition, in this implementation, the bearer object in the processing information further should complete the second forwarding action, and the method may further include the following operation:

The gateway user plane entity performs the second forwarding action that the bearer object should complete, so as to encapsulate, into the first target signaling packet, packet type information that is of the first target signaling packet and that is obtained by performing the first forwarding action; and that the gateway user plane entity performs the fifth forwarding action that the forwarding plane control object should complete, so as to forward the first target signaling packet to the gateway control plane entity includes:

The gateway user plane entity performs the fifth forwarding action that the forwarding plane control object should complete, so as to forward the encapsulated first target signaling packet to the forwarding plane control object.

In this implementation, the encapsulated first target signaling packet may be sent to the gateway control plane entity by performing the fifth forwarding action.

In this implementation, the first target signaling packet may be forwarded upstream. In addition, in this implementation, the first target signaling packet may be a DHCP signaling packet or a PPP signaling packet. In addition, an object and action orchestration in the processing information may be:

Bearer_PacketMatch>>Bearer_EventReport>>UController_SendPacket

Bearer_PacketMatch indicates that the bearer object should complete the first forwarding action, Bearer_EventReport indicates that the bearer object should complete the second forwarding action, and UController_SendPacket indicates that the forwarding plane control object should complete the fifth forwarding action.

In this embodiment, the processing information includes the bearer object and the forwarding plane control object, the bearer object should complete the third forwarding action and the fifth forwarding action, and the forwarding plane control object should complete the fourth forwarding action.

Block 1302 may include:

The gateway user plane entity performs the fourth forwarding action that the forwarding plane control object should complete, so as to decapsulate a second target signaling packet sent by the gateway control plane entity; and the gateway user plane entity performs the third forwarding action that the bearer object should complete, so as to encapsulate the decapsulated second target signaling packet based on the attribute of the bearer object; and performs the fifth forwarding action that the bearer object should complete, so as to forward the encapsulated second target signaling packet to the user equipment.

In this implementation, an attribute of the forwarding plane control object may include a packet decapsulation type (for example, GTP-C), and the attribute of the bearer object may include a packet decapsulation type (for example, GTP-C) and an IP address of the user equipment.

In this implementation, the second target signaling packet may be forwarded downstream, and the second target signaling packet may be a response packet generated by the gateway control plane entity in response to the first target signaling packet. For example, in this implementation, the second target signaling packet may be a DHCP signaling packet or a PPP signaling packet, and the DHCP signaling packet or the PPP signaling packet may be a response packet generated by the gateway control plane entity in response to a DHCP signaling packet or a PPP signaling packet that is sent upstream by the gateway user plane entity. In addition, an object and action orchestration in the processing information may be:

UController_Decapsulate>>Bearer_Encapsulate>>Bear0er_SendPacket

UController_Decapsulate indicates that the forwarding plane control object should complete the fourth forwarding action, Bearer_Encapsulate indicates that the bearer object should complete the third forwarding action, and Bearer_SendPacket indicates that the bearer object should complete the fifth forwarding action.

In this embodiment, the processing information may include the link object and the forwarding plane control object, the link object should complete the first forwarding action, and the forwarding plane control object should complete the fifth forwarding action.

Block 1302 may include:

The gateway user plane entity performs the first forwarding action that the link object should complete, so as to identify a third target signaling packet that matches the attribute of the link object and that is sent by a peer gateway; and the gateway user plane entity performs the fifth forwarding action that the forwarding plane control object should complete, so as to forward the third target signaling packet to the gateway control plane entity.

In this implementation, information used for performing the first forwarding action that the link object should complete may include a packet protocol type. The packet protocol type may be delivered by the gateway control plane entity, and an attribute of the forwarding plane control object may include an IP address of the gateway control plane entity.

In addition, in this implementation, the link object in the processing information may further complete the second forwarding action, and the method may further include the following operation:

The gateway user plane entity performs the second forwarding action that the link object should complete, so as to encapsulate, into the third target signaling packet, packet type information that is of the third target signaling packet and that is obtained by performing the first forwarding action; and that the gateway user plane entity performs the fifth forwarding action that the forwarding plane control object should complete, so as to forward the third target signaling packet to the gateway control plane entity includes:

The gateway user plane entity performs the fifth forwarding action that the forwarding plane control object should complete, so as to forward the encapsulated third target signaling packet to the gateway control plane entity.

In this implementation, the encapsulated third target signaling packet may be sent to the gateway control plane entity by performing the fifth forwarding action.

In this implementation, the third target signaling packet may be forwarded upstream. In addition, in this implementation, the third target signaling packet may include a PMIP signaling packet, for example, a PBA packet.

In addition, in this implementation, an object and action orchestration in the processing information may be:

Link_PacketMatch>>Link_EventReport>>UController_SendPacket

UController_SendPacket indicates that the forwarding plane control object should complete the fifth forwarding action, Link_PacketMatch indicates that the link object should complete the first forwarding action, and Link_EventReport indicates that the link object should complete the second forwarding action.

In this embodiment, the processing information may include the link object and the forwarding plane control object, the link object should complete the third forwarding action and the fifth forwarding action, and the forwarding plane control object should complete the fourth forwarding action.

Block 1302 may include:

The gateway user plane entity performs the fourth forwarding action that the forwarding plane control object should complete, so as to decapsulate a fourth target signaling packet sent by the gateway control plane entity; and the gateway user plane entity performs the third forwarding action that the link object should complete, so as to encapsulate the decapsulated fourth target signaling packet based on the attribute of the link object; and performs the fifth forwarding action that the link object should complete, so as to forward the encapsulated fourth target packet to a peer gateway.

In this implementation, the fourth target signaling packet may be forwarded downstream. In addition, the fourth target signaling packet may include a PMIP signaling packet, for example, a PBU signaling packet. In addition, the PBU signaling packet may be a response packet generated by the gateway control plane entity in response to a PBA packet.

An attribute of the forwarding plane control object may include a packet decapsulation type (for example, GTP-C), and the attribute of the link object may include a packet encapsulation type (for example, GTP-C) and an IP address of the peer gateway.

In addition, in this implementation, an object and action orchestration in the processing information may be:

UController_Decapsulate>>>Link_Encapsulate>>>Link_SendPacket

UController_Decapsulate indicates that the forwarding plane control object should complete the fourth forwarding action, Link_Encapsulate indicates that the link object should complete the third forwarding action, and Link_SendPacket indicates that the link object should complete the fifth forwarding action.

In this embodiment, the processing information may include the link object and the forwarding plane control object, the link object should complete the first forwarding action, and the forwarding plane control object should complete the fifth forwarding action.

Block 1302 may include:

The gateway user plane entity performs the first forwarding action that the link object should complete, so as to identify a fifth target signaling packet that matches the attribute of the link object and that is sent by the user equipment; and the gateway user plane entity performs the fifth forwarding action that the forwarding plane control object should complete, so as to forward the fifth target signaling packet to the gateway control plane entity.

In this implementation, information used for performing the first forwarding action that the link object should complete may include a packet protocol type. The packet protocol type may be delivered by the gateway control plane entity, and an attribute of the forwarding plane control object may include an IP address of the gateway control plane entity.

In addition, in this implementation, the link object in the processing information may further complete the second forwarding action, and the method may further include the following operation:

The gateway user plane entity performs the second forwarding action that the link object should complete, so as to encapsulate, into the fifth target signaling packet, packet type information that is of the fifth target signaling packet and that is obtained by performing the first forwarding action; and that the gateway user plane entity performs the fifth forwarding action that the forwarding plane control object should complete, so as to forward the fifth target signaling packet to the gateway control plane entity includes:

The gateway user plane entity performs the fifth forwarding action that the forwarding plane control object should complete, so as to forward the encapsulated fifth target signaling packet to the gateway control plane entity.

In this implementation, the encapsulated fifth target signaling packet may be sent to the gateway control plane entity by performing the fifth forwarding action.

In this implementation, the fifth target signaling packet may be forwarded upstream. In addition, in this implementation, the fifth target signaling packet may include an IKE packet or an EAP signaling packet.

In addition, in this implementation, an object and action orchestration in the processing information may be:

Link_PacketMatch>>Link_EventReport>>UController_SendPacket

UController_SendPacket indicates that the forwarding plane control object should complete the fifth forwarding action, Link_PacketMatch indicates that the link object should complete the first forwarding action, and Link_EventReport indicates that the link object should complete the second forwarding action.

In this embodiment, the processing information includes the link object and the forwarding plane control object, the link object should complete the fifth forwarding action, and the forwarding plane control object should complete the fourth forwarding action.

Block 1302 may include:

The gateway user plane entity performs the fourth forwarding action that the forwarding plane control object should complete, so as to decapsulate a sixth target signaling packet sent by the gateway control plane entity; and the gateway user plane entity performs the fifth forwarding action that the link object should complete, so as to forward the sixth target signaling packet to the user equipment.

In this implementation, the sixth target signaling packet may be forwarded downstream. In addition, the sixth target signaling packet may be a response packet generated by the gateway control plane entity in response to the fifth target signaling packet. For example, the sixth target signaling packet may be an IKE signaling packet or an EAP signaling packet, and the EAP signaling packet may be a tunnel packet. Therefore, in this implementation, the IKE signaling packet or the EAP signaling packet sent by the gateway control plane entity may be a response packet generated by the gateway control plane entity in response to an IKE signaling packet or an EAP signaling packet that is sent upstream by the gateway user plane entity.

In this implementation, an attribute of the forwarding plane control object may include a packet decapsulation type (for example, GTP-C), and the attribute of the link object may include an IP address of the user equipment.

In addition, in this implementation, an object and action orchestration in the processing information may be:

UController_Decapsulate>>>Link_SendPacket

UController_Decapsulate indicates that the forwarding plane control object should complete the fourth forwarding action, and Link_SendPacket indicates that the link object should complete the fifth forwarding action.

In this embodiment, the processing information may include a first bearer object and the forwarding plane control object, the first bearer object should complete the sixth forwarding action and the fifth forwarding action, and the forwarding plane control object should complete the fourth forwarding action.

Block 1302 may include:

The gateway user plane entity performs the fourth forwarding action that the forwarding plane control object should complete, so as to decapsulate a seventh target signaling packet sent by the gateway control plane entity; and the gateway user plane entity performs the sixth forwarding action that the first bearer object should complete, so as to encrypt the seventh target signaling packet; and performs the fifth forwarding action that the first bearer object should complete, so as to forward the encrypted seventh target signaling packet to an authentication server by using the link object.

In this implementation, the seventh target signaling packet may be forwarded downstream. In addition, the seventh target signaling packet may be a PPP signaling packet, and the PPP signaling packet may be a tunnel type packet. In addition, in this implementation, the PPP signaling packet may be a response packet generated by the gateway control plane entity in response to a PPP signaling packet sent upstream by the gateway user plane entity.

In this implementation, an attribute of the forwarding plane control object may include a packet decapsulation type (for example, GTP-C), an attribute of the first bearer object may include an IP address of the authentication server, and key information used for performing the sixth forwarding action may be carried in the attribute of the first bearer object or delivered by the gateway control plane entity.

In addition, in this implementation, an object and action orchestration in the processing information may be:

UController_Decapsulate>>Bearer_Encrypt>>Bearer_SendPacket

UController_Decapsulate indicates that the forwarding plane control object should complete the fourth forwarding action, Bearer_Encrypt indicates that the bearer object should complete the sixth forwarding action, and Bearer_SendPacket indicates that the bearer object should complete the fifth forwarding action.

In this implementation, the processing information may further include the link object and a second bearer object, the link object should complete the seventh forwarding action and the third forwarding action, and the fifth forwarding action is corresponding to the second bearer object.

The method further includes:

The gateway user plane entity performs the seventh forwarding action that the link object should complete, so as to decrypt an eighth target signaling packet sent by the authentication server; and the gateway user plane entity performs the third forwarding action that the second bearer object should complete, so as to encapsulate the decrypted target signaling packet based on an attribute of the second bearer object; and performs the fifth forwarding action that the second bearer object should complete, so as to forward the encapsulated eighth target signaling packet to the user equipment.

In this implementation, the eighth target signaling packet may be forwarded downstream. In addition, the eighth target signaling packet may be a PPP signaling packet, and the PPP signaling packet may be a tunnel type packet. In addition, in this implementation, the eighth target signaling packet may be a response packet generated by the authentication server in response to the seventh target signaling packet sent by the gateway user plane entity. For example, in this implementation, the PPP signaling packet may be a response packet, for example, a tunnel negotiation signaling packet, generated by the authentication server in response to a PPP signaling packet sent by the gateway user plane entity.

In this implementation, key information used for performing the seventh forwarding action may be carried in the attribute of the link object, or delivered by the gateway control plane entity, and the attribute of the second bearer object may include a packet encapsulation type (for example, GTP-C) and an IP address of the user equipment.

In addition, in this implementation, an object and action orchestration in the processing information may be:

Link_Decrypt>>Bearer_Encapsulate>>Bearer_SendPacket

Link_Decrypt indicates that the link object should complete the seventh forwarding action, Bearer_Encapsulate indicates that the bearer object should complete the third forwarding action, and Bearer_SendPacket indicates that the bearer object should complete the fifth forwarding action.

In this embodiment, the processing information may include the bearer object and the forwarding plane control object, the bearer object should complete the sixth forwarding action and the fifth forwarding action, and the forwarding plane control object should complete the fourth forwarding action.

Block 1302 may include:

The gateway user plane entity performs the fourth forwarding action that the forwarding plane control object should complete, so as to decapsulate a ninth target signaling packet sent by the gateway control plane entity; and the gateway user plane entity performs the sixth forwarding action that the bearer object should complete, so as to encrypt the ninth target signaling packet; and performs the fifth forwarding action that the bearer object should complete, so as to forward the encrypted ninth target signaling packet to an authentication server.

In this implementation, the ninth target signaling packet may be forwarded upstream, the ninth target signaling packet may be a PPP signaling packet, and the PPP signaling packet may be a tunnel type packet.

In this implementation, an attribute of the forwarding plane control object may include a packet decapsulation type (for example, GTP-C), the attribute of the bearer object may include an IP address of the authentication server, and key information used for performing the sixth forwarding action may be carried in the attribute of the bearer object or delivered by the gateway control plane entity.

In addition, in this implementation, an object and action orchestration in the processing information may be:

UController_Decapsulate>>Bearer_Encrypt>>Bearer_SendPacket

UController_Decapsulate indicates that the forwarding plane control object should complete the fourth forwarding action, Bearer_Encrypt indicates that the bearer object should complete the sixth forwarding action, and Bearer_SendPacket indicates that the bearer object should complete the fifth forwarding action.

In this implementation, the processing information may further include the link object, the link object should complete the seventh forwarding action and the first forwarding action, and the forwarding plane control object further should complete the fifth forwarding action.

The method further includes:

The gateway user plane entity performs the seventh forwarding action that the link object should complete, so as to decrypt a signaling packet sent by the authentication server; and performs the first forwarding action that the link object should complete, so as to identify the decrypted signaling packet as a tenth target signaling packet; and the gateway user plane entity performs the fifth forwarding action that the forwarding plane control object should complete, to send the identified tenth target signaling packet to the gateway control plane entity.

In this implementation, the tenth target signaling packet may be forwarded downstream. In addition, the tenth target signaling packet may be a PPP signaling packet. In addition, in this implementation, the tenth target signaling packet may be a response packet generated by the authentication server in response to the ninth target signaling packet. For example, the PPP signaling packet may be a response packet generated by the authentication server in response to a PPP signaling packet sent by the gateway user plane entity.

In this implementation, key information used for performing the seventh forwarding action may be carried in the attribute of the link object, or delivered by the gateway control plane entity, an attribute of the forwarding plane control object may further include an IP address of the gateway control plane entity, and a packet protocol type used for performing the first forwarding action may be delivered by the gateway control plane entity.

In addition, in this implementation, an object and action orchestration in the processing information may be:

Link_Decrypt>>Link_PacketMatch>>Link_SendPacke

Link_Decrypt indicates that the link object should complete the seventh forwarding action, Link_PacketMatch indicates that the link object should complete the first forwarding action, and Link_SendPacke indicates that the link object should complete the fifth forwarding action.

In this implementation, before the identified tenth target signaling packet is sent to the forwarding plane control object, the tenth target signaling packet may be further encapsulated, that is, the link object in the forwarding information may further complete the second forwarding action, so as to send the encapsulated tenth target signaling packet to the gateway control plane entity.

In this embodiment, the processing information may include the bearer object and the forwarding plane control object, the bearer object should complete the fifth forwarding action, and the forwarding plane control object should complete the fourth forwarding action.

Block 1302 may include:

The gateway user plane entity performs the fourth forwarding action that the forwarding plane control object should complete, so as to decapsulate an eleventh target signaling packet sent by the gateway control plane entity; and the gateway user plane entity performs the fifth forwarding action that the bearer object should complete, so as to forward the eleventh target signaling packet to an authentication server.

In this implementation, the eleventh target signaling packet may be forwarded upstream. In addition, the eleventh target signaling packet may be an L2TP signaling packet.

In this implementation, an attribute of the forwarding plane control object may include a packet decapsulation type (GTP-C), and the attribute of the bearer object may include an IP address of the authentication server.

In addition, in this implementation, an object and action orchestration in the processing information may be:

UController_Decapsulate>>Bearer_SendPacket

UController_Decapsulate indicates that the forwarding plane control object should complete the fourth forwarding action, and Bearer_SendPacket indicates that the bearer object should complete the fifth forwarding action.

In this implementation, the processing information may further include the link object, the link object should complete the seventh forwarding action and the first forwarding action, and the forwarding plane control object further should complete the fifth forwarding action.

The method further includes:

The gateway user plane entity performs the seventh forwarding action that the link object should complete, so as to decrypt a signaling packet sent by the authentication server; and performs the first forwarding action that the link object should complete, so as to identify the decrypted signaling packet as a twelfth target signaling packet; and the gateway user plane entity performs the fifth forwarding action that the forwarding plane control object should complete, to send the identified twelfth target signaling packet to the gateway control plane entity.

In this implementation, the twelfth target signaling packet may be forwarded downstream, and the twelfth target signaling packet may be an L2TP signaling packet. In this implementation, the twelfth target signaling packet may be a response packet generated by the authentication server in response to the eleventh target signaling packet. For example, the L2TP signaling packet may be a response packet generated by the authentication server in response to an L2TP signaling packet sent by the gateway user plane entity.

In this implementation, an attribute of the forwarding plane control object may further include an IP address of the gateway control plane entity. Key information used for performing the seventh forwarding action may be carried in the attribute of the link object, or delivered by the gateway control plane entity, and a packet protocol type used for performing the first forwarding action may be delivered by the gateway control plane entity.

In addition, in this implementation, an object and action orchestration in the processing information may be:

Link_Decrypt>>Link_PacketMatch>>UController_SendPacket

Link_Decrypt indicates that the link object should complete the seventh forwarding action, Link_PacketMatch indicates that the link object should complete the first forwarding action, and UController_SendPacket indicates that the forwarding plane control object should complete the fifth forwarding action.

In this implementation, before the identified twelfth target signaling packet is sent to the forwarding plane control object, the twelfth target signaling packet may be further encapsulated, that is, the link object in the forwarding information may further complete the second forwarding action, so as to send the encapsulated twelfth target signaling packet to the gateway control plane entity.

In this embodiment, the processing information may include the link object and the forwarding plane control object, the link object should complete the first forwarding action, and the forwarding plane control object should complete the fifth forwarding action.

Block 1302 may include:

The gateway user plane entity performs the first forwarding action that the link object should complete, so as to identify a thirteenth target signaling packet that matches the attribute of the link object and that is sent by a gateway device; and the gateway user plane entity performs the fifth forwarding action that the forwarding plane control object should complete, so as to forward the thirteenth target signaling packet to the gateway control plane entity.

In this implementation, a packet protocol type used for performing the first forwarding action may be delivered by the gateway control plane entity, and an attribute of the forwarding plane control object may include an IP address of the gateway control plane entity.

In addition, in this implementation, the bearer object in the processing information further should complete the second forwarding action, and the method may further include the following operation:

The gateway user plane entity performs the second forwarding action that the bearer object should complete, so as to encapsulate, into the thirteenth target signaling packet, packet type information that is of the thirteenth target signaling packet and that is obtained by performing the first forwarding action; and that the gateway user plane entity performs the fifth forwarding action that the forwarding plane control object should complete, so as to forward the thirteenth target signaling packet to the gateway control plane entity includes:

The gateway user plane entity performs the fifth forwarding action that the forwarding plane control object should complete, so as to forward the encapsulated thirteenth target signaling packet to the forwarding plane control object.

In this implementation, the encapsulated thirteenth target signaling packet may be sent to the gateway control plane entity by performing the fifth forwarding action.

In this implementation, the thirteenth target signaling packet may be forwarded upstream. In addition, in this implementation, the thirteenth target signaling packet may be a GTP signaling packet, for example, a GTP-C type signaling packet. In addition, an object and action orchestration in the processing information may be:

Link_PacketMatch>>Link_EventReport>>UController_SendPacket

Link_PacketMatch indicates that the link object should complete the first forwarding action, Link EventReport indicates that the link object should complete the second forwarding action, and UController_SendPacket indicates that the forwarding plane control object should complete the fifth forwarding action.

In this implementation, the processing information may further include the bearer object, the bearer object should complete the third forwarding action and the fifth forwarding action, and the forwarding plane control object further should complete the fourth forwarding action.

The method may further include the following operations:

The gateway user plane entity performs the fourth forwarding action that the forwarding plane control object should complete, so as to decapsulate a fourteenth target signaling packet sent by the gateway control plane entity; and the gateway user plane entity performs the third forwarding action that the bearer object should complete, so as to encapsulate the decapsulated fourteenth target signaling packet based on the attribute of the bearer object; and performs the fifth forwarding action that the bearer object should complete, so as to forward the encapsulated fourteenth target signaling packet to the gateway device.

In this implementation, an attribute of the forwarding plane control object may include a packet decapsulation type (for example, GTP-C), and the attribute of the bearer object may include a packet encapsulation type (for example, GTP-C) and an IP address of the gateway device.

In this implementation, the fourteenth target signaling packet may be forwarded downstream. In addition, the fourteenth target signaling packet may be a response packet generated by the gateway control plane entity in response to the thirteenth target signaling packet. For example, in this implementation, the fourteenth target signaling packet may be a GTP signaling packet, for example, a GTP-C type signaling packet. The GTP-C type signaling packet may be a response packet generated by the gateway control plane entity in response to a GTP-C type signaling packet sent upstream by the gateway user plane entity. In addition, an object and action orchestration in the processing information may be:

UController_Decapsulate>>Bearer_Encapsulate>>Bearer_SendPacket

UController_Decapsulate indicates that the forwarding plane control object should complete the fourth forwarding action, Bearer_Encapsulate indicates that the bearer object should complete the third forwarding action, and Bearer_SendPacket indicates that the bearer object should complete the fifth forwarding action.

It should be noted that the target signaling packet described in this embodiment may be the same as the target signaling packet described in the embodiment shown in FIG. 3, and a forwarding procedure may be the same when the target signaling packet is forwarded. In the embodiment shown in FIG. 3, the forwarding procedure is described by using forwarding description information, and in this embodiment, the forwarding procedure is described by using the forwarding object and the forwarding action.

In this embodiment, a plurality of optional implementations are added based on the embodiment shown in FIG. 2, and all can reduce network costs.

Figure 14:
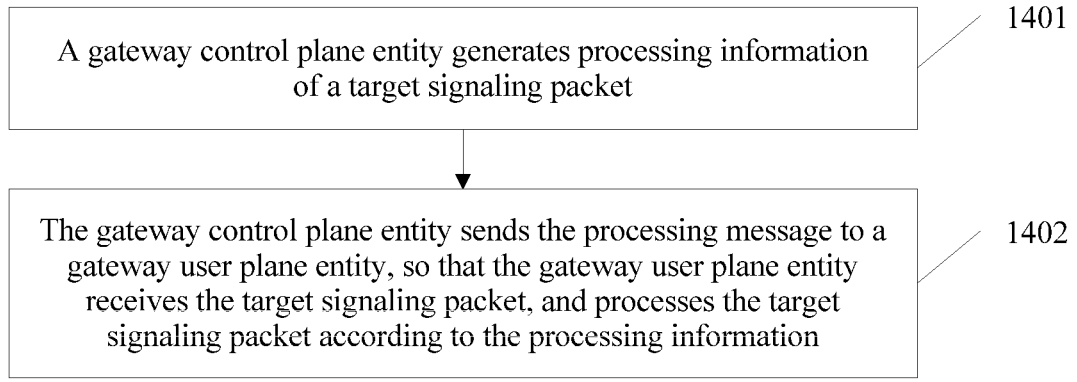
FIG. 14 is a schematic flowchart of another signaling packet processing method according to an embodiment of the present disclosure.

Referring to FIG. 14, FIG. 14 is a schematic flowchart of another signaling packet processing method based on an embodiment of the present disclosure. As shown in FIG. 14, the method includes the following operations.

1401. A gateway control plane entity generates processing information of a target signaling packet.

The processing information includes at least one of a forwarding object, type information of the target signaling packet that the gateway user plane entity should receive, or a destination address to which the gateway user plane entity should send the target signaling packet. That is, the processing information includes one or more of the forwarding object, the type information of the target signaling packet that the gateway user plane entity should receive, and the destination address to which the gateway user plane entity should send the target signaling packet. The type information indicates that a signaling packet of which type information should be received. In addition, the destination address may indicate a destination address to which the gateway user plane entity should send the target signaling packet.

In addition, the processing information may be generated by the gateway control plane entity based on local user configuration data or by means of OM configuration, or the processing information is obtained based on a pre-obtained correspondence between a signaling packet and processing information.

1402. The gateway control plane entity sends the processing message to a gateway user plane entity, so that the gateway user plane entity receives the target signaling packet, and processes the target signaling packet based on the processing information.

In this embodiment, the method may further include the following operation:

The gateway control plane entity receives the target signaling packet sent by the gateway user plane entity, and responds to the target signaling packet.

In this implementation, when receiving the target signaling packet, the gateway control plane entity may respond to the target signaling packet. Responding to the signaling packet is common knowledge of a person skilled in the art, and details are not described herein. For example, the method may further include the following operation:

The gateway control plane entity sends the gateway user plane entity a response packet generated in response to the target signaling packet, so that the gateway user plane entity forwards the response packet based on the processing information; or the gateway control plane entity sends the gateway user plane entity a response packet generated in response to the target signaling packet, and sends an operation instruction for the response packet to the gateway user plane entity, so that the gateway user plane entity forwards the response packet based on the operation instruction.

The operation instruction may further include an action and a destination address for the response packet, so that the gateway user plane entity can flexibly process the response packet based on the operation instruction. For a specific implementation, refer to the embodiment shown in FIG. 3, and details are not described herein.

In this implementation, the gateway user plane entity can forward the target signaling packet, and the gateway control plane entity can respond to the target signaling packet, so as to implement separation of forwarding and responding, and reduce network costs.

In this embodiment, the method may further include the following operation:

The gateway control plane entity sends the target signaling packet to the gateway user plane entity.

In this implementation, the gateway user plane entity can forward the signaling packet delivered by the gateway control plane entity.

In this embodiment, a processing procedure corresponding to the processing information may include:

The processing information is further used to describe an action for forwarding the target signaling packet, where the action includes at least one of the following:

packet receiving, packet sending, encapsulation, or decapsulation.

The gateway user plane entity performs, by using the processing information, at least one processing operation of packet receiving, packet sending, encapsulation, or decapsulation on the target signaling packet.

In this embodiment, when the target signaling packet is a signaling packet of user equipment, the gateway control plane entity may further create the processing information of the target signaling packet of the user equipment based on an access status of the user equipment, and send the processing information to the gateway user plane entity.

In this embodiment, specifically, the processing information of the target signaling packet may be created for the user equipment based on an access mode or subscription information of the user equipment. For example, the processing information of a forwarding procedure of the target signaling packet of the user equipment may be generated by means of local configuration or OM configuration; or the processing information of the target signaling packet of the user equipment may be generated by using a correspondence between an access status and processing information.

In this embodiment, the forwarding object may include any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity.

In this implementation, the forwarding action may include any one or more of the following:

a first forwarding action, a second forwarding action, a third forwarding action, a fourth forwarding action, a fifth forwarding action, a sixth forwarding action, or a seventh forwarding action.

The first forwarding action is used to receive a signaling packet that should be uploaded to a control plane, used to receive a response packet delivered by a control plane, or used to identify a packet protocol type.

The second forwarding action is used to encapsulate signaling packet type information into a packet. The packet type information may be obtained by performing the first forwarding action, and the information may further include event type information (for example, Signaling In).

The third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

It should be noted that the method described in this embodiment is written from a perspective that the gateway control plane entity is an execution body. The gateway control plane entity may be understood as the gateway control plane entity described in the embodiment shown in FIG. 3 or FIG. 13. The gateway control plane entity may implement any implementation of the gateway control plane entity described in the embodiment shown in FIG. 3 or FIG. 13. Details are not further described herein.

In this embodiment, the gateway control plane entity generates the processing information of the target signaling packet; and the gateway control plane entity sends the processing message to the gateway user plane entity, so that the gateway user plane entity receives the target signaling packet, and processes the target signaling packet based on the processing information. In this way, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

Figure 15:
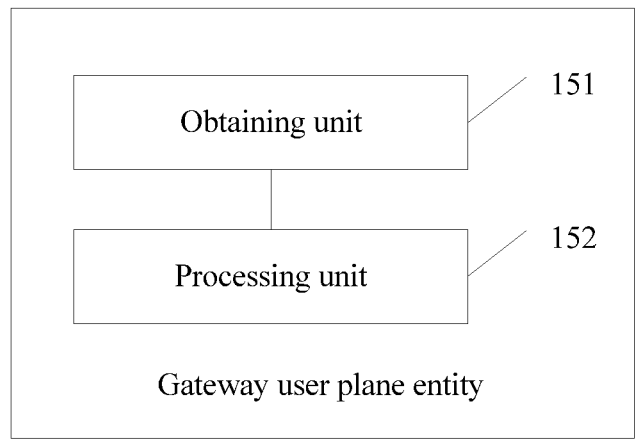
FIG. 15 is a schematic structural diagram of a gateway user plane entity according to an embodiment of the present disclosure.

Referring to FIG. 15, FIG. 15 is a schematic structural diagram of a gateway user plane entity based on an embodiment of the present disclosure. As shown in FIG. 15, the gateway user plane entity includes an obtaining unit 151 and a processing unit 152.

The obtaining unit 151 is configured to obtain processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and the processing unit 152 is configured to receive the target signaling packet, and process the target signaling packet based on the processing information.

It should be noted that in this embodiment, the processing unit 152 may process, for example, receive, forward, encode, decode, encapsulate, decapsulate, encrypt, and decrypt, the target signaling packet. That is, in this embodiment, the processing unit 152 has capabilities of processing, such as receiving, forwarding, encoding, decoding, encapsulating, decapsulating, encrypting, and decrypting, the signaling packet. For example, the processing unit 152 may include a physical communication module, a processor module, and a codec module.

In this embodiment, the processing information may be further used to describe an action for forwarding the target signaling packet, where the action includes at least one of the following:

packet receiving, packet sending, encapsulation, or decapsulation.

In this embodiment, the processing unit 152 may be further configured to receive, based on the type information included in the processing information, the target signaling packet that matches the type information and that is sent by a network entity, and forward the target signaling packet based on the action included in the processing information, where the network entity includes a gateway control plane entity, an external signaling packet sending entity, or user equipment.

In this embodiment, the processing unit 152 may be further configured to receive, based on the type information included in the processing information, a Dynamic Host Configuration Protocol DHCP signaling packet that matches the type information and that is sent by the user equipment, and send the DHCP signaling packet to the gateway control plane entity based on a destination address for sending the DHCP packet and the packet sending action that are included in the processing information, so that the gateway control plane entity generates a DHCP response packet for the DHCP signaling packet.

In this implementation, the processing unit 152 may be further configured to: based on the packet receiving action and the encapsulation action that are included in the processing information, receive the DHCP response packet sent by the gateway control plane entity, and encapsulate the DHCP response packet into a tunnel packet and send the tunnel packet to the user equipment.

In this implementation, the processing unit 152 may be further configured to send, to the gateway control plane entity, an indication message that a signaling packet received by the gateway control plane entity is a DHCP signaling type packet; and/or in this implementation, the processing unit 152 may be further configured to receive an operation instruction that is for performing tunnel packet encapsulation on the DHCP response packet and that is sent by the gateway control plane entity, receive, based on the packet receiving action included in the processing information, the DHCP response packet sent by the gateway control plane entity, and encapsulate the DHCP response packet into the tunnel packet based on the operation instruction and send the tunnel packet to the user equipment.

In this embodiment, the processing unit 152 may be configured to receive, based on the type information included in the processing information, a proxy binding update PBU packet that matches the type information and that is sent by the gateway control plane entity, where the PBU packet is generated by the gateway control plane entity;

the processing unit 152 may be further configured to send the PBU packet to the peer gateway based on a destination address for sending the PBU packet and the packet sending action that are included in the processing information, where a source address of the PBU packet forwarded to the peer gateway is an address of the gateway user plane entity; and the processing unit 152 may be further configured to receive a proxy binding acknowledgement PBA packet that is sent by the peer gateway and that is generated in response to the PBU packet, and send the PBA packet to the gateway control plane entity based on a destination address for sending the PBA packet and the packet sending action that are included in the processing information, so that the gateway control plane entity responds to the PBA packet.

In this embodiment, the obtaining unit 151 may be further configured to receive an operation instruction that is for directly sending a PBU packet and that is sent by the gateway control plane entity;

the processing unit 152 may be configured to receive, based on the type information included in the processing information, a proxy binding update PBU packet that matches the type information and that is sent by the gateway control plane entity, where the PBU packet is generated by the gateway control plane entity;

the processing unit 152 may be further configured to send the PBU packet to the peer gateway based on a destination address for sending the PBU packet that is included in the processing information and the operation instruction, where a source address of the PBU packet forwarded to the peer gateway is an address of the gateway user plane entity; and the processing unit 152 may be further configured to receive a PBA packet that is sent by the peer gateway and that is generated in response to the PBU packet, and send the PBA packet to the gateway control plane entity based on a destination address for sending the PBA packet and the packet sending action that are included in the processing information, so that the gateway control plane entity responds to the PBA packet.

In this embodiment, the processing unit 152 may be configured to receive, based on the type information included in the processing information, an Internet Key Exchange Protocol IKE signaling packet that matches the type information and that is sent by the user equipment, and send the IKE signaling packet to the gateway control plane entity based on a destination address for sending the IKE signaling packet and the packet sending action that are included in the processing information, so that the gateway control plane entity generates an IKE response packet for the IKE signaling packet.

In this embodiment, the processing unit 152 may be configured to: receive, based on the type information included in the processing information, an Extensible Authentication Protocol EAP signaling packet that matches the type information and that is sent by the user equipment, and send the EAP signaling packet to the gateway control plane entity based on a destination address for sending the EAP signaling packet and the packet sending action that are included in the processing information, so that the gateway control plane entity generates an EAP response packet for the EAP signaling packet.

In this embodiment, the processing unit 152 may be configured to: receive, based on the type information included in the processing information, a tunnel packet that matches the type information and that is sent by the user equipment, decapsulate, based on the packet decapsulation action included in the processing information, the tunnel packet to obtain a Point-to-Point Protocol PPP signaling packet, and forward the PPP signaling packet to the gateway control plane entity based on a destination address for sending the PPP signaling packet and the packet sending action that are included in the processing information, so that the gateway control plane entity generates a PPP response packet for the PPP signaling packet.

In this embodiment, the processing unit 152 may be configured to: receive, based on the type information included in the processing information, a tunnel packet that matches the type information and that is sent by the user equipment, decapsulate, based on the packet decapsulation action included in the processing information, the tunnel packet to obtain a PPP signaling packet, and forward the PPP signaling packet to the gateway control plane entity based on a destination address for sending the PPP signaling packet and the packet sending action that are included in the processing information, so that the gateway control plane entity triggers a tunnel creation procedure based on the PPP signaling packet.

In this embodiment, the processing unit 152 may be configured to receive, based on the type information included in the processing information, a PPP signaling packet that matches the type information and that is sent by the gateway control plane entity;

the processing unit 152 may be further configured to: based on the encapsulation action, the packet sending action, and a destination address for sending the PPP signaling packet that are included in the processing information, encapsulate the PPP signaling packet into a tunnel packet and send the tunnel packet to the authentication server, so that the authentication server generates a PPP response packet for the PPP signaling packet; and the processing unit 152 may be further configured to: based on the packet receiving action and the decapsulation action that are included in the processing information, receive a tunnel packet that carries the PPP response packet and that is sent by the authentication server, decapsulate the tunnel packet that carries the PPP response packet, so as to obtain the PPP response packet, and send the PPP response packet to the gateway control plane entity, so that the gateway control plane entity responds to the PPP response packet.

In this embodiment, the obtaining unit 151 may be further configured to receive an operation instruction that is for performing tunnel packet encapsulation on a PPP signaling packet and that is sent by the gateway control plane entity;

the processing unit 152 may be configured to receive, based on the type information included in the processing information, a PPP signaling packet that matches the type information and that is sent by the gateway control plane entity;

the processing unit 152 may be further configured to encapsulate the PPP signaling packet into a tunnel packet based on a destination address for sending the PPP signaling packet that is included in the operation instruction, and send the tunnel packet to the authentication server, so that the authentication server generates a PPP response packet for the PPP signaling packet; and the processing unit 152 may be further configured to: based on the packet receiving action and the decapsulation action that are included in the processing information, receive a tunnel packet that carries the PPP response packet and that is sent by the authentication server, decapsulate the tunnel packet that carries the PPP response packet, so as to obtain the PPP response packet, and send the PPP response packet to the gateway control plane entity, so that the gateway control plane entity responds to the PPP response packet.

In this embodiment, the processing unit 152 may be configured to receive, based on the type information included in the processing information, a Layer 2 Tunneling Protocol L2TP signaling packet that matches the type information and that is sent by the gateway control plane entity, where the L2TP signaling packet is generated by the gateway control plane entity;

the processing unit 152 may be further configured to send the L2TP signaling packet to the authentication server based on the packet sending action and a destination address for sending the L2TP signaling packet that are included in the processing information, where a source address of the L2TP signaling packet forwarded to the authentication server is an address of the gateway user plane entity; and the processing unit 152 may be further configured to: based on the packet receiving action and the packet sending action that are included in the processing information, receive an L2TP response packet that is sent by the authentication server and that is for responding to the L2TP signaling packet, and send the L2TP response packet to the gateway control plane entity, so that the gateway control plane entity responds to the L2TP response packet.

In this embodiment, the obtaining unit 151 may be further configured to receive an operation instruction that is for directly sending the L2TP signaling packet and that is sent by the gateway control plane entity;

the processing unit 152 may be configured to receive, based on the type information included in the processing information, a Layer 2 Tunneling Protocol L2TP signaling packet that matches the type information and that is sent by the gateway control plane entity, where the L2TP signaling packet is generated by the gateway control plane entity;

the processing unit 152 may be further configured to send the L2TP signaling packet to the authentication server based on a destination address for sending the L2TP signaling packet that is included in the operation instruction, where a source address of the L2TP signaling packet forwarded to the authentication server is an address of the gateway user plane entity; and the processing unit 152 may be further configured to: based on the packet receiving action and the packet sending action that are included in the processing information, receive an L2TP response packet that is sent by the authentication server and that is for responding to the L2TP signaling packet, and send the L2TP response packet to the gateway control plane entity, so that the gateway control plane entity responds to the L2TP response packet.

In this embodiment, the processing unit 152 may be configured to receive, based on the type information included in the processing information, a GTP-C signaling type packet that matches the type information and that is sent by a network element device, and send the GTP-C signaling type packet to the gateway control plane entity based on a destination address for sending the GTP-C signaling type packet and the packet sending action that are included in the processing information, so that the gateway control plane entity generates a GTP-C response packet for the GTP-C signaling type packet, where a destination TEID of the GTP-C response packet is a TEID of an interface between the network element device and the gateway user plane entity; and the processing unit 152 may be further configured to receive, based on the packet receiving action included in the processing information, the GTP-C response packet sent by the gateway control plane entity, and forward the GTP-C response packet to the network element device.

In this embodiment, the forwarding object may include any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity.

The forwarding action includes any one or more of the following:

a first forwarding action, a second forwarding action, a third forwarding action, a fourth forwarding action, a fifth forwarding action, a sixth forwarding action, or a seventh forwarding action.

The first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

In this implementation, the processing unit 152 may be configured to receive the target signaling packet, and perform the forwarding action that the forwarding object should complete, so as to forward the target signaling packet.

It should be noted that the gateway user plane entity described in this embodiment may be understood as the gateway user plane entity described in the embodiment shown in FIG. 3 or FIG. 13. The gateway user plane entity may implement any implementation of the gateway user plane entity described in the embodiment shown in FIG. 3 or FIG. 13. Details are not further described herein.

In this embodiment, the gateway user plane entity obtains the processing information of the target signaling packet; and the gateway user plane entity receives the target signaling packet, and processes the target signaling packet based on the processing information. In this way, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

Figure 16:
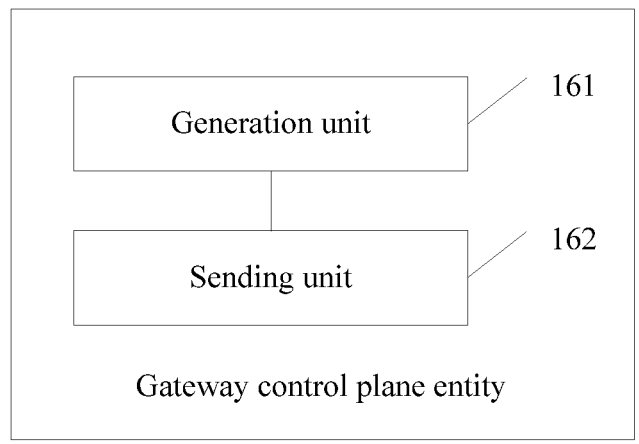
FIG. 16 is a schematic structural diagram of a gateway control plane entity according to an embodiment of the present disclosure.

Referring to FIG. 16, FIG. 16 is a schematic structural diagram of a gateway control plane entity based on an embodiment of the present disclosure. As shown in FIG. 16, the gateway control plane entity includes a generation unit 161 and a sending unit 162.

The generation unit 161 is configured to generate processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and the sending unit 162 is configured to send the processing message to the gateway user plane entity, so that the gateway user plane entity receives the target signaling packet, and processes the target signaling packet based on the processing information.

Figure 17:
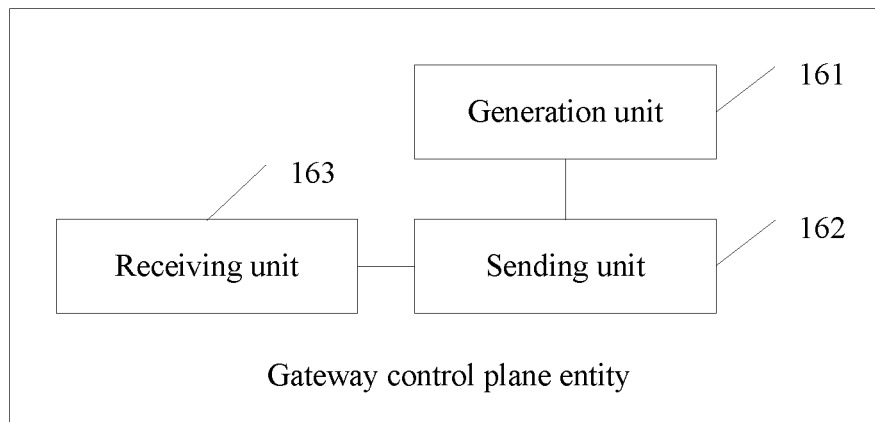
FIG. 17 is a schematic structural diagram of another gateway control plane entity according to an embodiment of the present disclosure.

In this embodiment, as shown in FIG. 17, the entity may further include:

a receiving unit 163, configured to receive the target signaling packet sent by the gateway user plane entity, and respond to the target signaling packet.

In this implementation, the sending unit 162 may be further configured to send the gateway user plane entity a response packet generated in response to the target signaling packet, so that the gateway user plane entity forwards the response packet based on the processing information; or the sending unit 162 may be further configured to send the gateway user plane entity a response packet generated in response to the target signaling packet, and send an operation instruction for the response packet to the gateway user plane entity, so that the gateway user plane entity forwards the response packet based on the operation instruction.

In this embodiment, the sending unit 162 may be further configured to send the target signaling packet to the gateway user plane entity.

In this embodiment, the processing information may be further used to describe an action for forwarding the target signaling packet, where the action includes at least one of the following:

packet receiving, packet sending, encapsulation, or decapsulation.

In this embodiment, the forwarding object may include any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity.

The forwarding action includes any one or more of the following:

a first forwarding action, a second forwarding action, a third forwarding action, a fourth forwarding action, a fifth forwarding action, a sixth forwarding action, or a seventh forwarding action.

The first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

It should be noted that the gateway control plane entity described in this embodiment may be understood as the gateway control plane entity described in the embodiment shown in FIG. 3, FIG. 13, or FIG. 14. The gateway control plane entity may implement any implementation of the gateway control plane entity described in the embodiment shown in FIG. 3, FIG. 13, or FIG. 14. Details are not further described herein.

In this embodiment, the gateway control plane entity generates the processing information of the target signaling packet; and the gateway control plane entity sends the processing message to the gateway user plane entity, so that the gateway user plane entity receives the target signaling packet, and processes the target signaling packet based on the processing information. In this way, the gateway user plane entity can flexibly process the signaling packet based on the obtained processing information. Therefore, when a network should support a new protocol, the gateway user plane entity obtains processing information of a new-protocol-based signaling packet, so as to process the new-protocol-based signaling packet. Therefore, no gateway should be additionally deployed, so as to reduce network costs.

Figure 18:
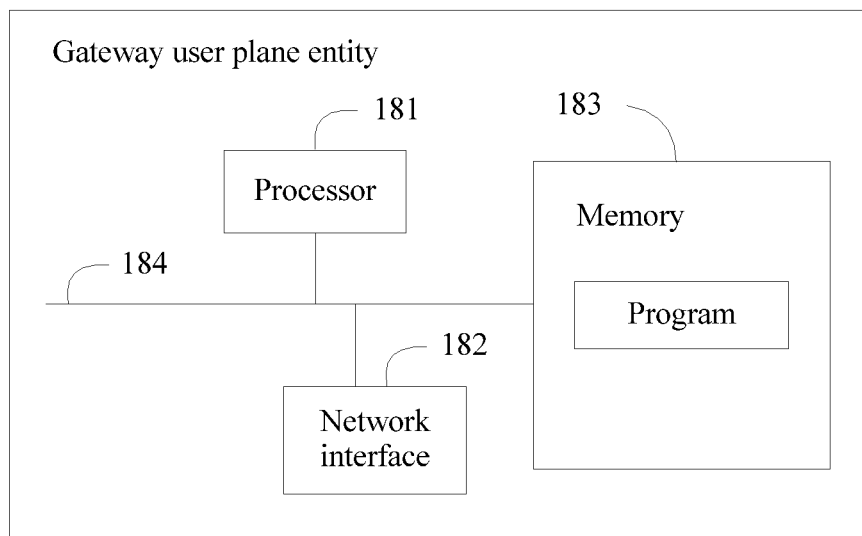
FIG. 18 is a schematic structural diagram of another gateway user plane entity according to an embodiment of the present disclosure.

Referring to FIG. 18, FIG. 18 is a schematic structural diagram of another gateway user plane entity based on an embodiment of the present disclosure. As shown in FIG. 18, the gateway user plane entity includes a processor 181, a network interface 182, a memory 183, and a communications bus 184, where the communications bus 184 is configured to implement connection and communication among the processor 181, the network interface 182, and the memory 183, and the processor 181 executes a program stored in the memory 183 to implement the following method:

obtaining processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and receiving the target signaling packet, and processing the target signaling packet based on the processing information.

In this embodiment, the processing information may be further used to describe an action for forwarding the target signaling packet, where the action includes at least one of the following:

packet receiving, packet sending, encapsulation, or decapsulation.

In this embodiment, the program that is executed by the processor 181 and that is of receiving the target signaling packet, and processing the target signaling packet based on the processing information may include:

receiving, based on the type information included in the processing information, the target signaling packet that matches the type information and that is sent by a network entity, and forwarding the target signaling packet based on the action included in the processing information, where the network entity includes a gateway control plane entity, an external signaling packet sending entity, or user equipment.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a Dynamic Host Configuration Protocol DHCP signaling packet that matches the type information and that is sent by the user equipment, and sending the DHCP signaling packet to the gateway control plane entity based on a destination address for sending the DHCP packet and the packet sending action that are included in the processing information, so that the gateway control plane entity generates a DHCP response packet for the DHCP signaling packet.

In this embodiment, the program executed by the processor 181 may further include:

based on the packet receiving action and the encapsulation action that are included in the processing information, receiving the DHCP response packet sent by the gateway control plane entity, and encapsulating the DHCP response packet into a tunnel packet and sending the tunnel packet to the user equipment.

In this embodiment, the program executed by the processor 181 may further include:

sending, to the gateway control plane entity, an indication message that a signaling packet received by the gateway control plane entity is a DHCP signaling type packet; and/or receiving an operation instruction that is for performing tunnel packet encapsulation on the DHCP response packet and that is sent by the gateway control plane entity, receiving, based on the packet receiving action included in the processing information, the DHCP response packet sent by the gateway control plane entity, and encapsulating the DHCP response packet into the tunnel packet based on the operation instruction and sending the tunnel packet to the user equipment.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a proxy binding update PBU packet that matches the type information and that is sent by the gateway control plane entity, where the PBU packet is generated by the gateway control plane entity; and sending the PBU packet to the peer gateway based on a destination address for sending the PBU packet and the packet sending action that are included in the processing information, where a source address of the PBU packet forwarded to the peer gateway is an address of the gateway user plane entity; and the program executed by the processor 181 may further include:

receiving a proxy binding acknowledgement PBA packet that is sent by the peer gateway and that is generated in response to the PBU packet, and sending the PBA packet to the gateway control plane entity based on a destination address for sending the PBA packet and the packet sending action that are included in the processing information, so that the gateway control plane entity responds to the PBA packet.

In this embodiment, the program executed by the processor 181 may further include:

receiving an operation instruction that is for directly sending a PBU packet and that is sent by the gateway control plane entity;

the program that is executed by the processor 181 and that is of receiving the target signaling packet, and processing the target signaling packet based on the processing information may include:

receiving, based on the type information included in the processing information, a proxy binding update PBU packet that matches the type information and that is sent by the gateway control plane entity, where the PBU packet is generated by the gateway control plane entity; and sending the PBU packet to the peer gateway based on a destination address for sending the PBU packet that is included in the processing information and the operation instruction, where a source address of the PBU packet forwarded to the peer gateway is an address of the gateway user plane entity; and the program executed by the processor 181 may further include:

receiving a PBA packet that is sent by the peer gateway and that is generated in response to the PBU packet, and sending the PBA packet to the gateway control plane entity based on a destination address for sending the PBA packet and the packet sending action that are included in the processing information, so that the gateway control plane entity responds to the PBA packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, an Internet Key Exchange Protocol IKE signaling packet that matches the type information and that is sent by the user equipment, and sending the IKE signaling packet to the gateway control plane entity based on a destination address for sending the IKE signaling packet and the packet sending action that are included in the processing information, so that the gateway control plane entity generates an IKE response packet for the IKE signaling packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, an Extensible Authentication Protocol EAP signaling packet that matches the type information and that is sent by the user equipment, and sending the EAP signaling packet to the gateway control plane entity based on a destination address for sending the EAP signaling packet and the packet sending action that are included in the processing information, so that the gateway control plane entity generates an EAP response packet for the EAP signaling packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a tunnel packet that matches the type information and that is sent by the user equipment, decapsulating, based on the packet decapsulation action included in the processing information, the tunnel packet to obtain a Point-to-Point Protocol PPP signaling packet, and forwarding the PPP signaling packet to the gateway control plane entity based on a destination address for sending the PPP signaling packet and the packet sending action that are included in the processing information, so that the gateway control plane entity generates a PPP response packet for the PPP signaling packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a tunnel packet that matches the type information and that is sent by the user equipment, decapsulating, based on the packet decapsulation action included in the processing information, the tunnel packet to obtain a PPP signaling packet, and forwarding the PPP signaling packet to the gateway control plane entity based on a destination address for sending the PPP signaling packet and the packet sending action that are included in the processing information, so that the gateway control plane entity triggers a tunnel creation procedure based on the PPP signaling packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a PPP signaling packet that matches the type information and that is sent by the gateway control plane entity; and based on the encapsulation action, the packet sending action, and a destination address for sending the PPP signaling packet that are included in the processing information, encapsulating the PPP signaling packet into a tunnel packet, and sending the tunnel packet to the authentication server, so that the authentication server generates a PPP response packet for the PPP signaling packet; and the program executed by the processor 181 may further include:

based on the packet receiving action and the decapsulation action that are included in the processing information, receiving a tunnel packet that carries the PPP response packet and that is sent by the authentication server, decapsulating the tunnel packet that carries the PPP response packet, so as to obtain the PPP response packet, and sending the PPP response packet to the gateway control plane entity, so that the gateway control plane entity responds to the PPP response packet.

In this embodiment, the program executed by the processor 181 may further include:

receiving an operation instruction that is for performing tunnel packet encapsulation on a PPP signaling packet and that is sent by the gateway control plane entity; and the program that is executed by the processor 181 and that is of receiving the target signaling packet, and processing the target signaling packet based on the processing information may include:

receiving, based on the type information included in the processing information, a PPP signaling packet that matches the type information and that is sent by the gateway control plane entity; and encapsulating the PPP signaling packet into a tunnel packet based on a destination address for sending the PPP signaling packet that is included in the operation instruction, and sending the tunnel packet to the authentication server, so that the authentication server generates a PPP response packet for the PPP signaling packet; and the program executed by the processor 181 may further include:

based on the packet receiving action and the decapsulation action that are included in the processing information, receiving a tunnel packet that carries the PPP response packet and that is sent by the authentication server, decapsulating the tunnel packet that carries the PPP response packet, so as to obtain the PPP response packet, and sending the PPP response packet to the gateway control plane entity, so that the gateway control plane entity responds to the PPP response packet.

In this embodiment, the program that is executed by the processor 181 and that is of receiving the target signaling packet delivered by a gateway control plane entity, and forwarding the target signaling packet based on a processing procedure corresponding to the processing information may include:

receiving, based on the type information included in the processing information, a Layer 2 Tunneling Protocol L2TP signaling packet that matches the type information and that is sent by the gateway control plane entity, where the L2TP signaling packet is generated by the gateway control plane entity; and sending the L2TP signaling packet to the authentication server based on the packet sending action and a destination address for sending the L2TP signaling packet that are included in the processing information, where a source address of the L2TP signaling packet forwarded to the authentication server is an address of the gateway user plane entity; and the program executed by the processor 181 may further include:

based on the packet receiving action and the packet sending action that are included in the processing information, receiving an L2TP response packet that is sent by the authentication server and that is for responding to the L2TP signaling packet, and sending the L2TP response packet to the gateway control plane entity, so that the gateway control plane entity responds to the L2TP response packet.

In this embodiment, the program executed by the processor 181 may further include:

receiving an operation instruction that is for directly sending the L2TP signaling packet and that is sent by the gateway control plane entity;

the program that is executed by the processor 181 and that is of receiving the target signaling packet, and processing the target signaling packet based on the processing information may include:

receiving, based on the type information included in the processing information, a Layer 2 Tunneling Protocol L2TP signaling packet that matches the type information and that is sent by the gateway control plane entity, where the L2TP signaling packet is generated by the gateway control plane entity; and sending the L2TP signaling packet to the authentication server based on a destination address for sending the L2TP signaling packet that is included in the operation instruction, where a source address of the L2TP signaling packet forwarded to the authentication server is an address of the gateway user plane entity; and the program executed by the processor 181 may further include:

based on the packet receiving action and the packet sending action that are included in the processing information, receiving an L2TP response packet that is sent by the authentication server and that is for responding to the L2TP signaling packet, and sending the L2TP response packet to the gateway control plane entity, so that the gateway control plane entity responds to the L2TP response packet.

In this embodiment, the program that is executed by the processor 181 and that is of receiving, based on the type information included in the processing information, the target signaling packet that matches the type information and that is sent by a network entity, and forwarding the target signaling packet based on the action included in the processing information may include:

receiving, based on the type information included in the processing information, a GTP-C signaling type packet that matches the type information and that is sent by a network element device, and sending the GTP-C signaling type packet to the gateway control plane entity based on a destination address for sending the GTP-C signaling type packet and the packet sending action that are included in the processing information, so that the gateway control plane entity generates a GTP-C response packet for the GTP-C signaling type packet, where a destination TEID of the GTP-C response packet is a TEID of an interface between the network element device and the gateway user plane entity; and the program executed by the processor 181 may further include:

receiving, by the gateway user plane entity based on the packet receiving action included in the processing informa-tion, the GTP-C response packet sent by the gateway control plane entity, and forwarding the GTP-C response packet to the network element device.

In this embodiment, the forwarding object may include any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity.

The forwarding action may include any one or more of the following:

a first forwarding action, a second forwarding action, a third forwarding action, a fourth forwarding action, a fifth forwarding action, a sixth forwarding action, or a seventh forwarding action.

The first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

In this implementation, the program that is executed by the processor 181 and that is of receiving the target signaling packet, and processing the target signaling packet based on a processing procedure corresponding to the processing information may include:

receiving the target signaling packet, and performing the forwarding action that the forwarding object should complete, so as to forward the target signaling packet.

It should be noted that the gateway user plane entity described in this embodiment may be understood as the gateway user plane entity described in the embodiment shown in FIG. 3 or FIG. 13. The gateway user plane entity may implement any implementation of the gateway user plane entity described in the embodiment shown in FIG. 3 or FIG. 13. Details are not further described herein.

In this embodiment, the gateway user plane entity obtains the processing information of the target signaling packet; and the gateway user plane entity receives the target signaling packet, and processes the target signaling packet based on the processing information. In this way, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

Figure 19:
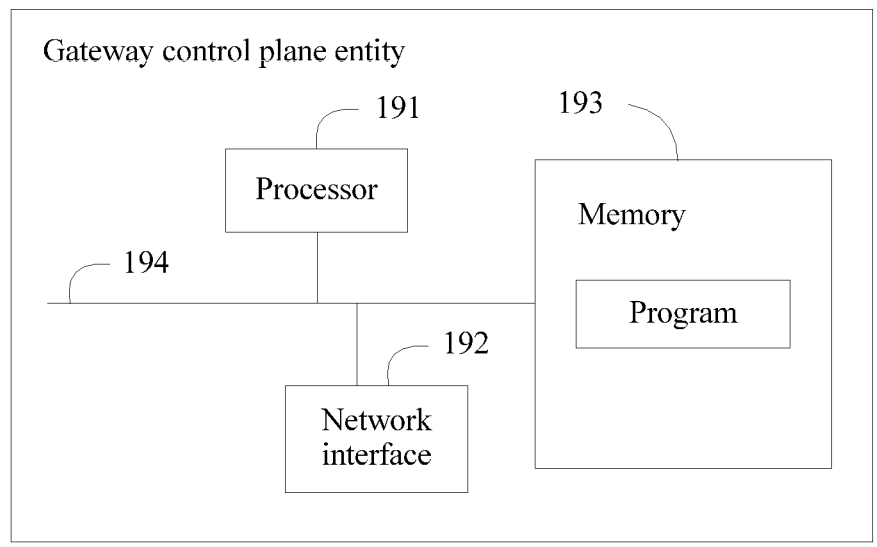
FIG. 19 is a schematic structural diagram of another gateway control plane entity according to an embodiment of the present disclosure.

Referring to FIG. 19, FIG. 19 is a schematic structural diagram of another gateway control plane entity based on an embodiment of the present disclosure. As shown in FIG. 19, the gateway control plane entity includes a processor 191, a network interface 192, a memory 193, and a communications bus 194, where the communications bus 194 is configured to implement connection and communication among the processor 191, the network interface 192, and the memory 193, and the processor 191 executes a program stored in the memory 193 to implement the following method:

generating processing information of a target signaling packet, where the processing information includes at least one of a forwarding object, type information of the target signaling packet that the gateway user plane entity should receive, or a destination address to which the gateway user plane entity should send the target signaling packet, the forwarding object includes an attribute and a forwarding action that the forwarding object should complete, the attribute is used to describe a characteristic of the forwarding object, and the forwarding action is used to describe a function of the forwarding object; and sending the processing message to the gateway user plane entity, so that the gateway user plane entity receives the target signaling packet, and processes the target signaling packet based on the processing information.

In this embodiment, the program executed by the processor 191 may further include:

receiving the target signaling packet sent by the gateway user plane entity, and responding to the target signaling packet.

In this embodiment, the program executed by the processor 191 may further include:

sending the gateway user plane entity a response packet generated in response to the target signaling packet, so that the gateway user plane entity forwards the response packet based on the processing information; or sending the gateway user plane entity a response packet generated in response to the target signaling packet, and sending an operation instruction for the response packet to the gateway user plane entity, so that the gateway user plane entity forwards the response packet based on the operation instruction.

In this embodiment, the program executed by the processor 191 may further include:

sending the target signaling packet to the gateway user plane entity.

In this embodiment, the processing information may be further used to describe an action for forwarding the target signaling packet, where the action includes at least one of the following:

packet receiving, packet sending, encapsulation, or decapsulation.

In this embodiment, the forwarding object may include any one or more of the following:

a link object, a bearer object, or a forwarding plane control object; where the link object is used to receive a packet that matches an attribute of the link object and complete packet decapsulation, the bearer object is used to receive a packet that matches an attribute of the bearer object and complete packet-related encapsulation, and the forwarding plane control object is used to receive and send a message from the gateway control plane entity.

The forwarding action includes any one or more of the following:

a first forwarding action, a second forwarding action, a third forwarding action, a fourth forwarding action, a fifth forwarding action, a sixth forwarding action, or a seventh forwarding action.

The first forwarding action is used to receive a signaling packet that should be uploaded to a control plane, used to receive a response packet delivered by a control plane, or used to identify a packet protocol type;

the second forwarding action is used to encapsulate signaling packet type information into a packet;

the third forwarding action is used to encapsulate a packet;

the fourth forwarding action is used to decapsulate a packet;

the fifth forwarding action is used to send a packet to a destination network entity;

the sixth forwarding action is used to encrypt a packet; and the seventh forwarding action is used to decrypt a packet.

It should be noted that the gateway control plane entity described in this embodiment may be understood as the gateway control plane entity described in the embodiment shown in FIG. 3, FIG. 13, or FIG. 14. The gateway control plane entity may implement any implementation of the gateway control plane entity described in the embodiment shown in FIG. 3, FIG. 13, or FIG. 14. Details are not further described herein.

In this embodiment, the gateway control plane entity generates the processing information of the target signaling packet; and the gateway control plane entity sends the processing message to the gateway user plane entity, so that the gateway user plane entity receives the target signaling packet, and processes the target signaling packet based on the processing information. In this way, the gateway user plane entity can flexibly process the signaling packet based on the obtained processing information. Therefore, when a network needs to support a new protocol, the gateway user plane entity obtains processing information of a new-protocol-based signaling packet, so as to process the new-protocol-based signaling packet. Therefore, no gateway needs to be additionally deployed, so as to reduce network costs.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM).

What are disclosed above are merely example embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. A signaling packet processing method, comprising:

obtaining, by a gateway user plane entity from a gateway control plane entity, processing information of a target signaling packet, wherein the processing information comprises a forwarding object, type information of the target signaling packet that the gateway user plane entity should receive, and a destination address to which the gateway user plane entity should send the target signaling packet, wherein the forwarding object comprises an attribute and a forwarding action that the forwarding object should complete, wherein the attribute is used to describe a characteristic of the forwarding object, and wherein the forwarding action is used to describe a function of the forwarding object; and receiving, by the gateway user plane entity based on the type information, the target signaling packet that matches the type information and that is sent by a network entity, and forwarding the target signaling packet based on the forwarding action, wherein the network entity comprises the gateway control plane entity, an external signaling packet sending entity, or user equipment, and processing the target signaling packet based on the processing information.

2. The method of claim 1, wherein the processing information is further used to describe an action for forwarding the target signaling packet and wherein the action comprises at least one of the following:

packet receiving, packet sending, encapsulation, or decapsulation.

3. The method of claim 1, wherein the receiving the target signaling packet and forwarding the target signaling packet comprise:

receiving, by the gateway user plane entity based on the type information, a Dynamic Host Configuration Protocol (DHCP) signaling packet that matches the type information and that is sent by the user equipment, and sending the DHCP signaling packet to the gateway control plane entity based on a destination address for sending the DHCP signaling packet and packet sending action, so that the gateway control plane entity generates a DHCP response packet for the DHCP signaling packet.

4. The method of claim 3, wherein the method further comprises:

based on a packet receiving action and an encapsulation action, receiving, by the gateway user plane entity, the DHCP response packet sent by the gateway control plane entity, and encapsulating the DHCP response packet into a tunnel packet and sending the tunnel packet to the user equipment.

5. A gateway user plane entity, comprising:

a processor, a network interface, a memory, and a communications bus, wherein the communications bus is configured to implement connection and communication among the processor, the network interface, and the memory, and the processor executes a program stored in the memory to implement the following method:

obtaining processing information of a target signaling packet from a gateway control plane entity, wherein the processing information comprises a forwarding object, type information of the target signaling packet that the gateway user plane entity should receive, and a destination address to which the gateway user plane entity should send the target signaling packet, the forwarding object comprises an attribute and a forwarding action that the forwarding object should complete, the attribute is used to describe a characteristic of the forwarding object, and the forwarding action is used to describe a function of the forwarding object; and receiving, based on the type information, the target signaling packet that matches the type information and that is sent by a network entity, and forwarding the target signaling packet based on the forwarding action, wherein the network entity comprises the gateway control plane entity, an external signaling packet sending entity, or user equipment, and processing the target signaling packet based on the processing information.

6. The gateway user plane entity of claim 5, wherein the processing information is further used to describe an action for forwarding the target signaling packet, and the action comprises at least one of the following:

packet receiving, packet sending, encapsulation, or decapsulation.

7. The gateway user plane entity of claim 5, wherein receiving the target signaling packet and forwarding the target signaling packet comprise:

receiving, based on the type information, a Dynamic Host Configuration Protocol (DHCP) signaling packet that matches the type information and that is sent by the user equipment, and sending the DHCP signaling packet to the gateway control plane entity based on a destination address for sending the DHCP packet and the packet sending action, so that the gateway control plane entity generates a DHCP response packet for the DHCP signaling packet.

8. The gateway user plane entity of claim 7, wherein the method further comprises:

based on a packet receiving action and an encapsulation action, receiving the DHCP response packet sent by the gateway control plane entity, and encapsulating the DHCP response packet into a tunnel packet and sending the tunnel packet to the user equipment.

9. The gateway user plane entity of claim 8, wherein the method further comprises:

sending, to the gateway control plane entity, an indication message that a signaling packet received by the gateway control plane entity is a DHCP signaling type packet; and/or receiving an operation instruction that is for performing tunnel packet encapsulation on the DHCP response packet and that is sent by the gateway control plane entity, receiving, based on the packet receiving action, the DHCP response packet sent by the gateway control plane entity, and encapsulating the DHCP response packet into the tunnel packet based on the operation instruction and sending the tunnel packet to the user equipment.

10. The gateway user plane entity of claim 5, wherein receiving the target signaling packet and forwarding the target signaling packet comprise:

receiving, based on the type information, a proxy binding update (PBU) packet that matches the type information and that is sent by the gateway control plane entity, wherein the PBU packet is generated by the gateway control plane entity; and sending the PBU packet to a peer gateway based on a destination address for sending the PBU packet and a packet sending action, wherein a source address of the PBU packet forwarded to the peer gateway is an address of the gateway user plane entity; and the program executed by the processor further comprises:

receiving a proxy binding acknowledgement (PBA) packet that is sent by the peer gateway and that is generated in response to the PBU packet, and sending the PBA packet to the gateway control plane entity based on a destination address for sending the PBA packet and the packet sending action, so that the gateway control plane entity responds to the PBA packet.

11. The method of claim 1, wherein the method further comprises:

generating, by the gateway control plane entity, the processing information of the target signaling packet; and sending, by the gateway control plane entity, the processing information to the gateway user plane entity.

12. The method of claim 1, wherein the method further comprises:
receiving, by the gateway control plane entity, the target signaling packet sent by the gateway user plane entity, and responding to the target signaling packet.

13. The method of claim 1, wherein the method further comprises:
sending, by the gateway control plane entity, the gateway user plane entity a response packet generated in response to the target signaling packet, so that the gateway user plane entity forwards the response packet according to the processing information; or
sending, by the gateway control plane entity, the gateway user plane entity a response packet generated in response to the target signaling packet, and sending an operation instruction for the response packet to the gateway user plane entity, so that the gateway user plane entity forwards the response packet according to the operation instruction.

14. The method of claim 1, wherein the method further comprises:
sending, by the gateway control plane entity, the target signaling packet to the gateway user plane entity.

15. A system, comprises a gateway user plane entity and a gateway control plane entity, wherein:
the gateway control plane entity, configured to generate the processing information of a target signaling packet; and configured to send the processing information to the gateway user plane entity;
the gateway user plane entity, configured to obtain processing information of a target signaling packet from the gateway control plane entity, wherein the processing information comprises a forwarding object, type information of the target signaling packet that the gateway user plane entity should receive, and a destination address to which the gateway user plane entity should send the target signaling packet, wherein the forwarding object comprises an attribute and a forwarding action that the forwarding object should complete, wherein the attribute is used to describe a characteristic of the forwarding object, and wherein the forwarding action is used to describe a function of the forwarding object; and configured to receive the target signaling packet that matches the type information based on the type information and that is sent by a network entity, and forward the target signaling packet based on the forwarding action, wherein the network entity comprises the gateway control plane entity, an external signaling packet sending entity, or user equipment, and process the target signaling packet based on the processing information.

16. The system of claim 15, wherein the processing information is further used to describe an action for forwarding the target signaling packet and wherein the action comprises at least one of the following:
packet receiving, packet sending, encapsulation, or decapsulation.

17. The system of claim 15, wherein the gateway user plane entity, configured to:
receive a Dynamic Host Configuration Protocol (DHCP) signaling packet that matches the type information based on the type information and that is sent by the user equipment; and
the gateway user plane entity, configured to send the DHCP signaling packet to the gateway control plane entity based on a destination address for sending the DHCP signaling packet and a packet sending action, so that the gateway control plane entity generates a DHCP response packet for the DHCP signaling packet.

* * * * *

UNITED STATES PATENT AND TRADEMARK OFFICE
CERTIFICATE OF CORRECTION

PATENT NO. : 10,700,966 B2
APPLICATION NO. : 15/990074
DATED : June 30, 2020
INVENTOR(S) : Yixu Xu, Han Zhou and Zhongping Chen Page 1 of 1

It is certified that error appears in the above-identified patent and that said Letters Patent is hereby corrected as shown below:

In the Claims

Claim 3, Column 63, Line 28, "...DHCP signaling packet and packet sending...," insert the word --a-- after "and"

Claim 7, Column 64, Line 17, "the packet sending action...," delete the word "the" and insert the word --a--

Signed and Sealed this
First Day of December, 2020

Andrei Iancu
*Director of the United States Patent and Trademark Office*